United States Patent
Pei et al.

(10) Patent No.: US 11,933,524 B2
(45) Date of Patent: Mar. 19, 2024

(54) TANDEM-STRUCTURED COOLING DEVICE DRIVEN BY ELECTROSTATIC FORCE

(71) Applicant: The Regents of the University of California, Oakland, CA (US)

(72) Inventors: Qibing Pei, Calabasas, CA (US); Yuan Meng, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 109 days.

(21) Appl. No.: 17/472,182

(22) Filed: Sep. 10, 2021

(65) Prior Publication Data
US 2022/0074631 A1  Mar. 10, 2022

Related U.S. Application Data

(60) Provisional application No. 63/076,509, filed on Sep. 10, 2020.

(51) Int. Cl.
*F25B 21/00* (2006.01)
*F28D 15/00* (2006.01)

(52) U.S. Cl.
CPC .............. *F25B 21/00* (2013.01); *F28D 15/00* (2013.01); *F25B 2321/001* (2013.01)

(58) Field of Classification Search
CPC .... F25B 21/00; F25B 2321/001; F28D 15/00; Y02B 30/00
See application file for complete search history.

(56) References Cited

U.S. PATENT DOCUMENTS

| | | | |
|---|---|---|---|
| 4,599,677 A * | 7/1986 | Lawless | H01G 4/1254 252/519.15 |
| 7,787,254 B2 | 8/2010 | Clayton et al. | |
| 8,695,353 B2 | 4/2014 | Casasanta | |
| 10,125,758 B2 | 11/2018 | Ducharme et al. | |
| 11,397,031 B2 | 7/2022 | Pei et al. | |
| 11,466,906 B2 * | 10/2022 | Xie | F25B 21/02 |
| 2014/0034529 A1 | 2/2014 | McGuire et al. | |
| 2015/0129765 A1 * | 5/2015 | Yonemura | G01J 5/10 250/338.3 |

(Continued)

FOREIGN PATENT DOCUMENTS

FR       3105380 A1 *  6/2021
WO     2011075335      6/2011

OTHER PUBLICATIONS

PCT International Search Report & Written Opinion dated Oct. 17, 2018, International Application No. PCT/US18/31410.

(Continued)

*Primary Examiner* — Ana M Vazquez
(74) *Attorney, Agent, or Firm* — GATES & COOPER LLP

(57) ABSTRACT

A device comprising one or more heat transfer laminates each including an electrode, a first dielectric layer on a first side of the electrode, and a second dielectric layer on a second side of the electrode; a plurality of flexible electrocaloric elements, each of the flexible electrocaloric elements including an electrocaloric material layer, a flexible electrode layer on the electrocaloric layer, one or more fixed portions each attached to one of heat transfer laminates, and a movable portion that is movable with respect to the one of the heat transfer laminates.

21 Claims, 38 Drawing Sheets

(56) References Cited

U.S. PATENT DOCUMENTS

2015/0208498 A1  7/2015  Poon
2017/0030529 A1  2/2017  Bergmann et al.

OTHER PUBLICATIONS

Ma, R., et al., "Highly efficient electrocaloric cooling with electrostatic actuation", Science, 2017, pp. 1130-1134, vol. 357.
Ma, R., et al., "Supplementary Materials for Highly efficient electrocaloric cooling with electrostatic actuation", Science, 2017, 1130, 357.
Meng, Y., et al., "A cascade electrocaloric cooling device for large temperature lift", Nature Energy, 2020, pp. 996-1002, vol. 5.

* cited by examiner

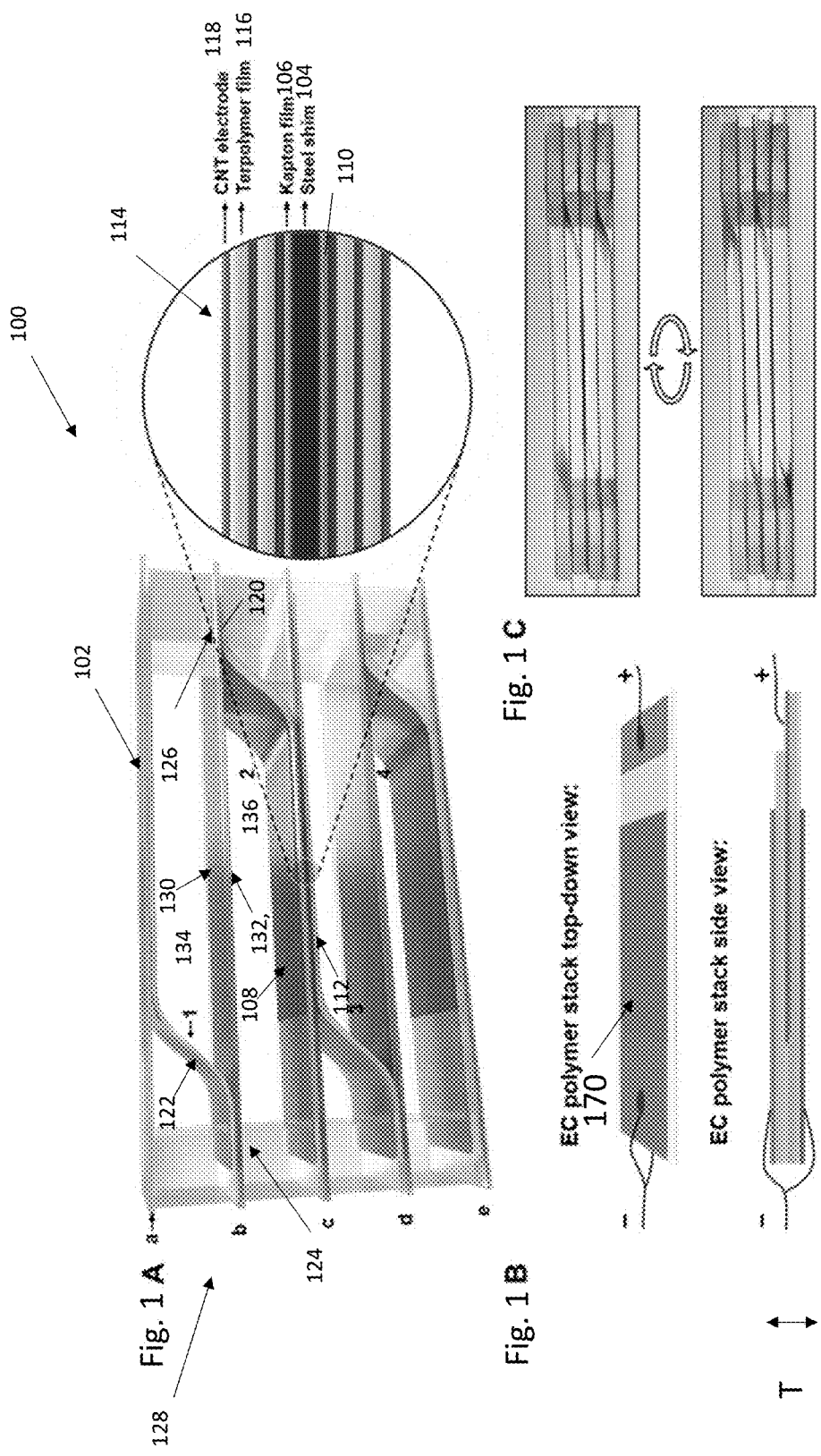

TANDEM-STRUCTURED COOLING DEVICE DRIVEN BY ELECTROSTATIC FORCE

CROSS REFERENCE TO RELATED APPLICATIONS

This application claims the benefit under 35 USC 119(e) of and commonly assigned U.S. Provisional Patent Application Ser. No. 63/076,509, filed Sep. 10, 2020, by Qibing Pei and Yuan Meng, entitled "A TANDEM-STRUCTURED COOLING DEVICE DRIVEN BY ELECTROSTATIC FORCE," which application is incorporated by reference herein.

STATEMENT REGARDING FEDERALLY SPONSORED RESEARCH AND DEVELOPMENT

This invention was made with government support under Grant Number N00014-19-1-2212, awarded by the U.S. Navy, Office of Naval Research. The government has certain rights in the invention.

BACKGROUND OF THE INVENTION

1. Field of the Invention

The present invention relates to solid state heat transporting devices and methods of making the same.

2. Description of the Related Art (Note: This application references a number of different publications as indicated throughout the specification by one or more reference numbers as superscripts, e.g., [x]. A list of these different publications ordered according to these reference numbers can be found below in the section entitled "References." Each of these publications is incorporated by reference herein.)

Solid-state cooling, especially caloric effect based cooling such as magnetocaloric effect (MCE)[1-3], electrocaloric effect (ECE)[4-9], and elasto(baro)caloric effect (eCE/BCE)[10-13], are ecofriendly alternatives to vapor compression refrigeration technology. Cooling based on ECE, which features direct electricity-utilization, is praised for high efficiency, low cost, simplicity in setup, and feasibility for applications at compact scales[14,15]. The ECE, available in materials such as ferroelectric ceramics and polymers, is a thermodynamic phenomenon where the alignment of dipolar polarization by electric field gives rise to adiabatic temperature change $(\Delta T_{ECE})$[15]. Latest innovations have lead to several promising EC materials. High quality multilayer capacitor $PbSc_{0.5}Ta_{0.5}O_3$ set a new benchmark for EC ceramics with $\Delta T_{ECE}$ of 5.5 K near room temperature[4]. Manipulating defects in the poly(vinylidene fluoride) (PVDF)-based polymer systems has proved successful; the bulky co-monomer CFE in poly(vinylidene fluorideter-trifluoroethylene-ter-chlorofluoroethylene) [P(VDF-TrFE-CFE)] terpolymer results in smaller dipole size and endows relaxor behavior[7,16]. In the terpolymer films, $\Delta T_{ECE}$ of 14.8 K was reported at a high electric field of 150 MV/m at room temperature[17]. Nanocomposites via dispersing EC ceramic nanofibers into the terpolymer have also been reported to provide high $\Delta T_{ECE}$[5,6].

A practical solid-state cooling device is the ultimate goal of all EC material development effort. In constructing an EC-based heat pump, one has to consider the fact that the EC material heats up and cools down as a whole, and a moving media is a necessity to guide the heat flow against the temperature gradient between the heat source and heat sink[14]. This is in contrast to Peltier coolers where charge carriers function as the media, and no macroscopic moving part is required, but at the penalty of heat conduction and thus reduced efficiency[18]. Previous EC device designs usually included either an external motor to actuate the EC working body[19-21], or a bulky mechanical pump to circulate heat-transfer fluid[15,22,23].

The temperature span of an EC device $(\Delta T_{device})$ is inherently restricted by the $\Delta T_{ECE}$. Analogous to the safe and stable operation of high voltage capacitors, the EC films are usually operated at 30% of breakdown field strength, with $\Delta T_{ECE}$ typically in the range of 1~10 K[14], which is too small for most practical applications[25]. Active heat regeneration with either fluid or solid as regenerative media is a conventional solution to expand device temperature span. Regeneration via oscillatory heat-exchange fluid has been demonstrated in various caloric-based cooling technologies[13,22,23,26]. However, the use of a working fluid and the requirement of an external pump to drive the fluid flow make it hard to scale down device size and add energy consumption. Solid-state regeneration has also been proposed employing a solid plate as the heat-exchange media, and the EC element is reciprocally transported with respect to the solid regenerator to build up a temperature span[20,27]. The motion of EC element is driven by a mechanical step motor, and a solid regenerator with anisotropic thermal conductivity is required to limit parasitic heat conduction. Another regeneration strategy involves two rotating EC rings, each alternating as an active EC working body, and solid-state regenerator for the other ring[21,28]. These solid-state regeneration devices are relatively complex and bulky, with room for further enhancement within cooling performance and energy efficiency on a system level.

A cascade structure for EC system was proposed two decades ago[29,30]. It allows the temperature profile of the cooling elements to be overlaid on one another[25,26,31]. The lack of successful experimental demonstration of a practical and energy-efficient design of a cascade structure manifests the significance of the challenges. The present disclosure overcomes these challenges.

SUMMARY OF THE INVENTION

The present disclosure describes a solid-state heat transporting cascade device. The device can be embodied in many ways including, but not limited to, the following.

1. A device comprising one or more heat transfer laminates each comprising a electrode a first dielectric layer on a first side of the electrode; and
   a second dielectric layer on a second side of the electrode;
   a plurality of flexible electrocaloric elements, each of the flexible electrocaloric elements comprising:
   an electrocaloric material layer;
   a flexible electrode layer on the electrocaloric layer;
   one or more fixed portions each attached to one of heat transfer laminates; and
   a movable portion that is movable with respect to the one of the heat transfer laminates.
2. The device of example 1, wherein:
   the one or more heat transfer laminates comprise a first heat transfer laminate and a second heat transfer laminate, the flexible electrocaloric elements comprise a first flexible electrocaloric element and a second flexible electrocaloric element,
the first flexible electrocaloric element has one of the fixed portions attached to a first portion of the first heat transfer laminate and the movable portion that is movable with respect to the first heat transfer laminate; and
the second flexible electrocaloric element has:
the one or more fixed portions comprising a first fixed portion attached to a second portion of the first heat transfer laminate and a second fixed portion attached to the second heat transfer laminate, and
the movable portion that is movable with respect to the second heat transfer laminate.

3. The device of examples 1 or 2, further comprising:
one or more components each comprising:
one of the heat transfer laminates comprising a first heat transfer laminate having opposite surfaces comprising a first surface opposite a second surface; and
a pair of the flexible electrocaloric elements comprising a first flexible electrocaloric element having one of the fixed portions attached to a first portion of the first heat transfer laminate and a second flexible electrocaloric element having one of the fixed portions attached to a second portion of the first heat transfer laminate; and wherein:
the first flexible electrocaloric element is controlled to form thermal contact with the first surface and the second flexible electrocaloric element is controlled to form thermal contact with the second surface so that various amounts of heat may be transported from the first flexible electrocaloric element to the second flexible electrocaloric element through the first heat transfer laminate.

4. The device of any of examples 1-3, wherein the electrocaloric material layer comprises an electrocaloric material that absorbs or releases the heat as a function of an electric field applied across the electrocaloric material.

5. The device of any of the examples 1-4, wherein a thermal contact of the flexible electrocaloric elements with the one of the heat transfer laminates is controlled by applying an electrostatic field between the flexible electrode layer and the electrode of the one of the heat transfer laminates.

6. The device of any of the examples 1-5, comprising a resistor connected in parallel with the flexible electrode layer and the electrode of the one of the heat transfer laminates.

7. The device of example 6, comprising a resistor connected in parallel with the flexible electrode layer of the first flexible electrocaloric element and the electrode of the first heat transfer laminate.

8. The device of example 3 and 7, further comprising a resistor connected in parallel with the flexible electrode layer of the second flexible electrocaloric element and the electrode on the first heat transfer laminate.

9. The device of any of examples 6-8 wherein the resistors have a resistance value greater than $10000\Omega$ but less than $1000000000\Omega$.

10. The cascade device of any of the examples 1-9, wherein the first dielectric layer and the second dielectric layer of the heat transfer laminates comprise at least one polymer selected from a polyimide, a polyurethane, a polyacrylate, a polyvinylidene fluoride, a polyethylene terephthalate, a polydimethylsiloxane, and/or a combination (mixture or copolymer) thereof.

11. The cascade device of any of the examples 1-10, wherein the electrode comprises at least one conductive material selected from one or more carbon nanotubes, one or more silver nanowires, graphene, one or more MXenes, a metal shim, indium-tin oxide, aluminum, and/or copper.

12. The cascade device of any of the examples 1-11, wherein the flexible electrode layer comprises at least one conductive material selected from one or more carbon nanotubes, one or more silver nanowires, graphene, one or more MXenes, a metal shim, indium-tin oxide, aluminum, and/or copper.

13. The cascade device of any of the examples 1-12, further comprising:
one or more components each comprising:
one of the heat transfer laminates comprising a first heat transfer laminate having opposite surfaces comprising a first surface opposite a second surface; and
a pair of the flexible electrocaloric elements comprising a first flexible electrocaloric element having the fixed portion attached to a first portion of the first heat transfer laminate and a second flexible electrocaloric element having the fixed portion attached to a second portion of the first heat transfer laminate; and wherein:
the first flexible electrocaloric element defines a first air gap between its flexible electrode layer and a first smooth surface of the first heat transfer laminate (e.g., the first smooth surface can be the first smooth surface of the first dielectric layer).

14. The cascade device of example 13, wherein the second flexible electrocaloric element defines a second air gap between its flexible electrode layer and a second smooth surface of the first heat transfer laminate (e.g., the second smooth surface can be the second smooth surface of the second dielectric layer).

15. The device of any of the examples 1-14, further comprising:
one or more components each comprising:
one of the heat transfer laminates comprising a first heat transfer laminate having opposite surfaces comprising a first surface opposite a second surface; and
a pair of the flexible electrocaloric elements comprising a first flexible electrocaloric element having the fixed portion attached to a first portion of the first heat transfer laminate and a second flexible electrocaloric element having the fixed portion attached to a second portion of the first heat transfer laminate; and wherein:
the first flexible electrocaloric element defines a first contact zone where a first air gap decreases to zero at a location between the first flexible electrocaloric element and the first heat transfer laminate, when a voltage is applied between the flexible electrode layer of the first flexible electrocaloric element and the electrode of the first heat transfer laminate.

16. The device of example 15, wherein:
the heat transfer laminates comprise the first heat transfer laminate and a second heat transfer laminate,
the second flexible electrocaloric element defines a second contact zone where a second air gap decreases to zero at a location between the second flexible electrocaloric element and the second heat transfer laminate, when:
the voltage between the flexible electrode layer of the first electrocaloric element and the electrode of the first heat transfer laminate is removed, and
a voltage is applied between the flexible electrode layer of the second flexible electrocaloric element and the electrode of the second heat transfer laminate.

17. The device of any of the examples 1-16, comprising a number n of the flexible electrocaloric elements and a number m=n-1 of the heat transfer laminates.

18. The device of example 17, wherein:
the heat transfer laminates comprise one or more groups of the heat transfer laminates, each of the groups comprising a first heat transfer laminate, a second heat transfer laminate, and a third heat transfer laminate,
the first heat transfer laminate forms a thermal contact with two neighboring ones of the flexible electrocaloric elements comprising an upper electrocaloric element and a lower electrocaloric element, when:
a voltage is applied both:
between the flexible electrode layer of the upper electrocaloric element and the electrode of the first heat transfer laminate, and
between the flexible electrode layer of the lower electrocaloric element and the electrode of the first heat transfer laminate, and
no voltage is applied:
between the flexible electrode layer of the upper electrocaloric element and the electrode of the second heat transfer laminate above the upper electrocaloric element, and
between the flexible electrode layer of the lower electrocaloric element and the electrode of the third heat transfer laminate below the lower electrocaloric element; and
the second heat transfer laminate and the third heat transfer laminate adjacent each form an air gap with their respective adjacent flexible electrocaloric elements.

19. The device of examples 17 or 18, wherein:
the flexible electrocaloric elements are disposed in a plurality of m pairs, each pair comprising a first flexible electrocaloric element and a second flexible electrocaloric element attached on opposite sides of the one of the heat transfer laminates; and
the first flexible electrocaloric element and the second electrocaloric element are biased to move in opposite directions.

20. The device of any of the examples 17-19, wherein the flexible electrocaloric elements are disposed in a plurality of m pairs, each pair comprising a first flexible electrocaloric element and a second flexible electrocaloric element attached on opposite sides of one of the heat transfer laminates, the device further comprising a source applying a first electric field to the first flexible electrocaloric element in each of the pairs and a second electric field to the second flexible electrode in each of the pairs.

21. The device of example 20 further comprising a charge recovery circuit applying the electric fields.

22. The device any of the examples 17-21, wherein a charge recovery circuit that transfers charges between the first flexible electrocaloric element and the second flexible electrocaloric element in each pair of the flexible electrocaloric elements.

23 The (e.g., multilayer cascade) device of any of the examples 40-45, wherein:
the flexible electrocaloric elements are disposed in a plurality of m pairs, each pair comprising a first flexible electrocaloric element and a second flexible electrocaloric element,
each of the heat transfer laminates are attached to a different one of the m pairs, so that the $j^{th}$ heat transfer laminate is attached between the first flexible electrocaloric element and the second electrocaloric element in the $j^{th}$ pair, for $1 \leq j \leq m$,
movement and position of the flexible electrocaloric elements are controlled by a charge transfer circuit, so that:
the first electrocaloric element forms a first contact zone on the $j^{th}$ heat transfer laminate in or attached to the $j^{th}$ pair and a second contact zone with the $j-1^{th}$ heat transfer laminate in or attached to the $j-1^{th}$ pair, for $2 < j \leq m$,
the second electrocaloric element forms a third contact zone on the $j^{th}$ heat transfer laminate in or attached to the $j^{th}$ pair and a fourth contact zone on the $j+1^{th}$ heat transfer laminate in or attached to the $j+1^{th}$ pair, for $1 \leq j < m$
the first flexible electrocaloric elements oscillate between their respective first and second contact zones and the second flexible electrocaloric elements oscillate between their respective third and fourth contact zones,
the first flexible electrocaloric elements are operated using an antiphase electrocaloric effect so that when the first flexible electrocaloric elements are heated up, the second flexible electrocaloric elements are cooled down, and vice versa;
charges are transferred between the first flexible electrocaloric element and the second flexible electrocaloric element in each the m pairs of the flexible electrocaloric elements;
when the first flexible electrocaloric element next to a heat sink is in thermal contact with the heat sink and is heated through the electrocaloric effect, every other one of the first flexible electrocaloric elements are heated through the electrocaloric effect, while all the second flexible electrocaloric elements are cooled through the electrocaloric cooling effect and the second flexible electrocaloric element next to a heat source is in thermal contact with the heat source.

24. The (e.g., multilayer cascade) device of any of the examples 1-23, wherein:
each flexible electrocaloric element has a thickness in a range of 1~1000 micrometers,
each flexible electrocaloric element has heat transfer area in a range of 5 to 50000 mm$^2$; and/or
the periodic electric field has a frequency in a range of 0.01 to 20 Hz and a magnitude less than 500 MV/m.

25. The device of any of the examples 1-23, wherein:
each flexible electrocaloric element has at least one of a thickness T wherein $1 \leq T \leq 1000$ micrometers or a heat transfer area A wherein $5 \leq A \leq 50000$ mm$^2$; and
the electric field is periodic and has a frequency F wherein $0.01 \leq F \leq 20$ Hz and a magnitude less than 500 MV/m; and
the flexible electrocaloric elements comprise vinylidene fluoride-trifluoroethylene-chlorfluoroethylene terpolymer (P(VDF-TrFE-CFE)).

26. The device of any of the examples 1-25, wherein:
the electrode comprises a support (e.g., mechanical support supporting the dielectric layers) or the electrode comprises a layer on the support (e.g., mechanical support mechanically supporting the electrode layer and/or the dielectric layers),
the support comprises a metal sheet or a dielectric sheet, and
the dielectric layers are on opposite sides of the support.

27. The (e.g., heat transporting cascade) device of any of the examples 1-26, wherein the flexible electrocaloric elements comprise vinylidene fluoride-trifluoroethylene-chlorfluoroethylene terpolymer (P(VDF-TrFE-CFE)).

BRIEF DESCRIPTION OF THE DRAWINGS

Referring now to the drawings in which like reference numbers represent corresponding parts throughout:

FIGS. 1A-1C. A solid-state, cascade-structured electrocaloric cooling device. FIG. 1A shows Left: schematic illustration of a 4-layer, EC cooling device; Labels a, b, c, d, e indicate laminated sheet made of steel shim (60 µm) covered with Kapton tape (50 µm) on both sides; a & e as the top and bottom laminates are termed heat sink, and heat source of the device; labels 1, 2, 3, 4 refer to P(VDF-TrFE-CFE) terpolymer stacks that go through synchronized EC effect, and actuate in between their respective top and bottom laminates, during operation. Right: Illustration of a typical tandem junction that periodically forms and breaks during device operation (not to scale). EC stacks 2 & 3 go through antiphase EC effect, which creates a temperature gradient, allowing for unidirectional heat transfer over the tandem stack. FIG. 1B is an illustration of a EC polymer stack wired with DC power supply U2, which gives rise to the electrocaloric effect. FIG. 1C is a photograph of a 4-layer, cascade structured device actuated by electrostatic force; note that these are the only two possible configurations for the 4-layer device, based on the switchable electrostatic field distribution.

FIG. 2A is a schematic showing how a DC power source U1 is guided to two RC circuits, one at a time, and induces electrostatic attraction between charged electrode laminates and flexible EC polymer stacks. The electrostatic field drives the actuation of the 4 EC polymer stacks to make and break contact with their respective neighbouring laminates. Power source U2, which induces the electrocaloric effect of the polymer stacks, is correlated with the actuation cycle. The synchronized EC effect along with actuation behavior actively transport heat from the heat source to the heat sink, through the temporarily formed tandem junction structures. FIG. 2B is a time domain illustration of electric field induced by U1, U2, and positions of EC polymer stacks 1, 2, 3 & 4 relative to the device heat sink and heat source, in a continuously operating device. FIG. 2C is a time-temperature profile of two EC polymer stacks wired in a charge recovery circuit, with application and removal of a 60 MV/m electric field, at a 0.1 Hz frequency. FIG. 2D shows infrared thermal images of the two EC polymer stacks at moments of charge transfer indicated with arrows in FIG. 2C.

FIG. 3A shows a schematic of a 4-layer cascade cooling device, with a heat flux sensor (purple layer) attached to a cooling fin placed beneath the device heat source laminate. Thermal conductive paste was applied, and the sensor is used to measure heat flux drawn by the device. FIG. 3B shows Heat flux measured by the heat flux sensor in both heating and cooling modes of the cascade device, with an applied electric field of 60 MV/m and frequency of 0.1 Hz. FIG. 3C shows a comparison of heat flux measured in 4-layer, 2-layer cascade devices, and a unit device, with an applied electric field of 60 MV/m and frequency of 0.5 Hz. FIG. 3D shows Heat flux as a function of different frequencies of operation, for cascade cooling devices and unit device. FIG. 3E shows power consumption of a 4-layer cascade cooling device. The power cost is broken down into consumption of actuation and electrocaloric effect. FIG. 3F shows COP values of cascade cooling devices and unit device, under different frequencies of operation. Dashed curves in the figure serve as guides to the eye.

FIG. 4A shows measured temperature profile of heat sink and heat source of 4-layer (red), 2-layer (orange) cascade devices, and unit device (green), under 60 MV/m applied electric field and frequency of 1.0 Hz. FIG. 4B shows measured temperature profile of heat sink and heat source of 4-layer cascade devices, under 60 MV/m applied electric field, and 1.0 Hz (red), 0.5 Hz (orange) operation frequencies. FIG. 4C shows experimental and simulated $\Delta T_{device}$ of cascade devices containing 8, 6, 4, and 2 layers of EC elements, as well as a EC unit device, under different operation frequencies. FIG. 4D shows experimental and simulation result of temperature span of different cascade devices, under different applied electric fields and operation frequencies. Simulated heat flux (FIG. 4E), COP and COP/COP$_{Carnot}$ (FIG. 4F) values, as a function of temperature span between heat sink and heat source, in a 4-layer cascade device (hollow marker) and a unit cooling device (solid marker), under 60 MV/m. Dashed curves in the figure serve as guides to the eye.

FIG. 5A shows real-time temperature profile of an EC polymer stack in response to applied field intensity. FIG. 5B shows adiabatic temperature change of an EC polymer stack as a function of applied electric field. FIG. 5C shows electric displacement of the P(VDF-TrFE-CFE) film as a function of the ramping field intensity. The area enclosed by the loop indicates hysteresis loss of the material.

Figure 8A:
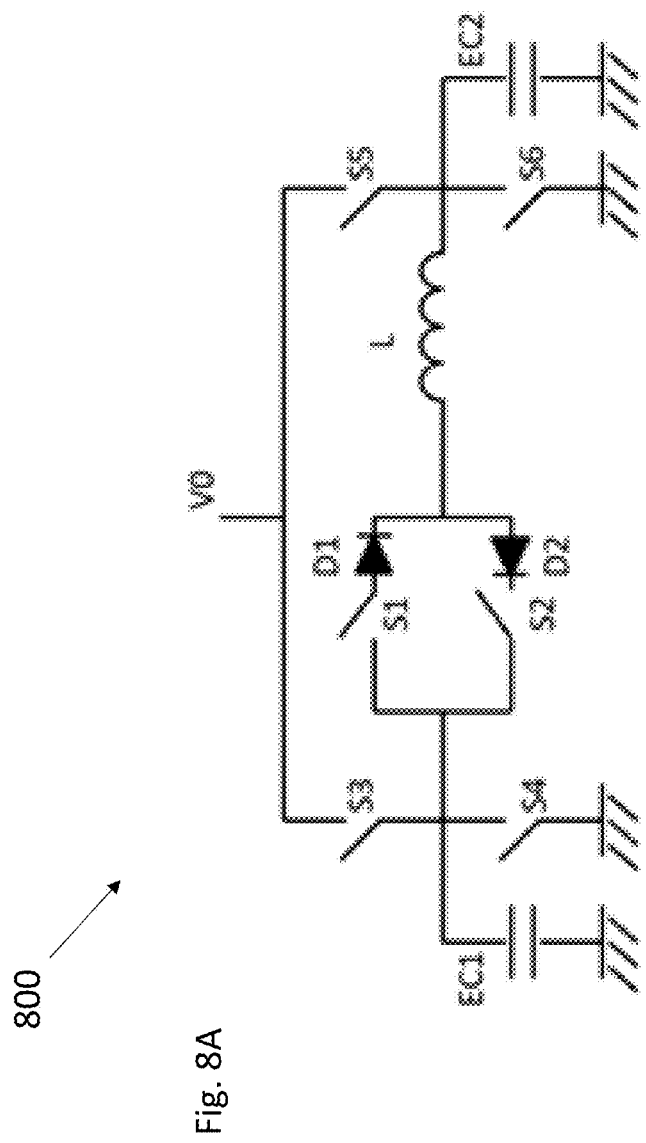
FIG. 8A shows an energy recovery circuit. All switches are initially open, an inductor of 220 µH was used. The charge transfer process goes as follow: step 1. S3, S6 closed, EC1 charged with V0, EC2 discharged; step 2. S3, S6 open, S1 closed, charge transferred from EC1 to EC2; step 3. S1 open, S5, S4 closed, EC2 fully charged with V0, EC1 discharged; step 4. S4, S5 open, S2 closed, charge transferred from EC2 to EC1. The four steps proceed periodically to transfer charge between EC1 and EC2.
Figure 8B:
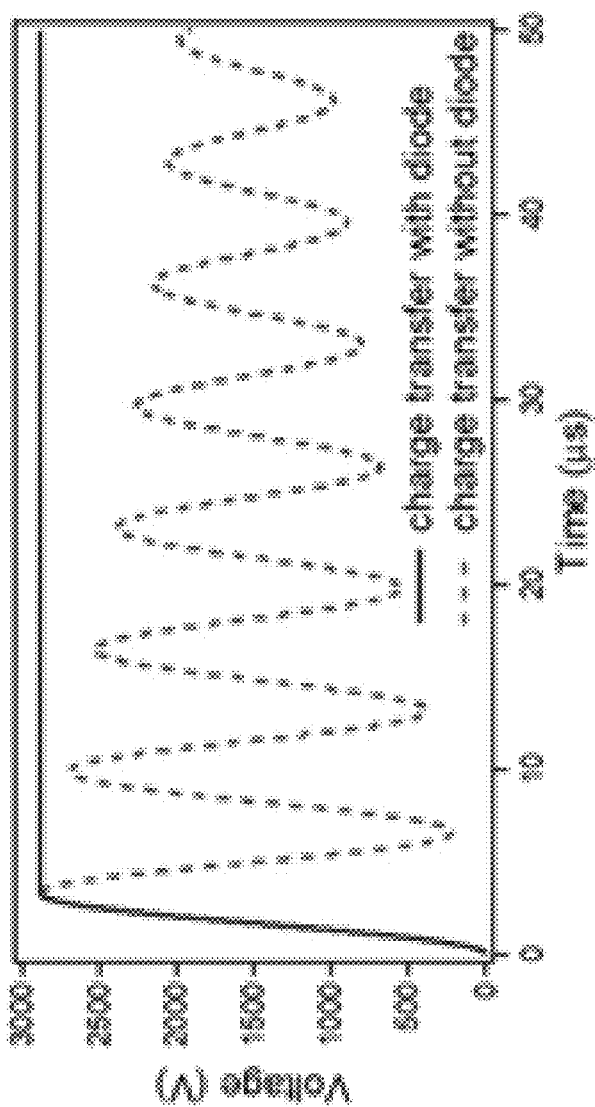

FIG. 8B shows simulated voltage changes on EC capacitor, in a charge transfer circuit: voltage held at peak value with diode presence (blue solid curve); voltage damping without diode (red dashed curve).

Figure 8C:
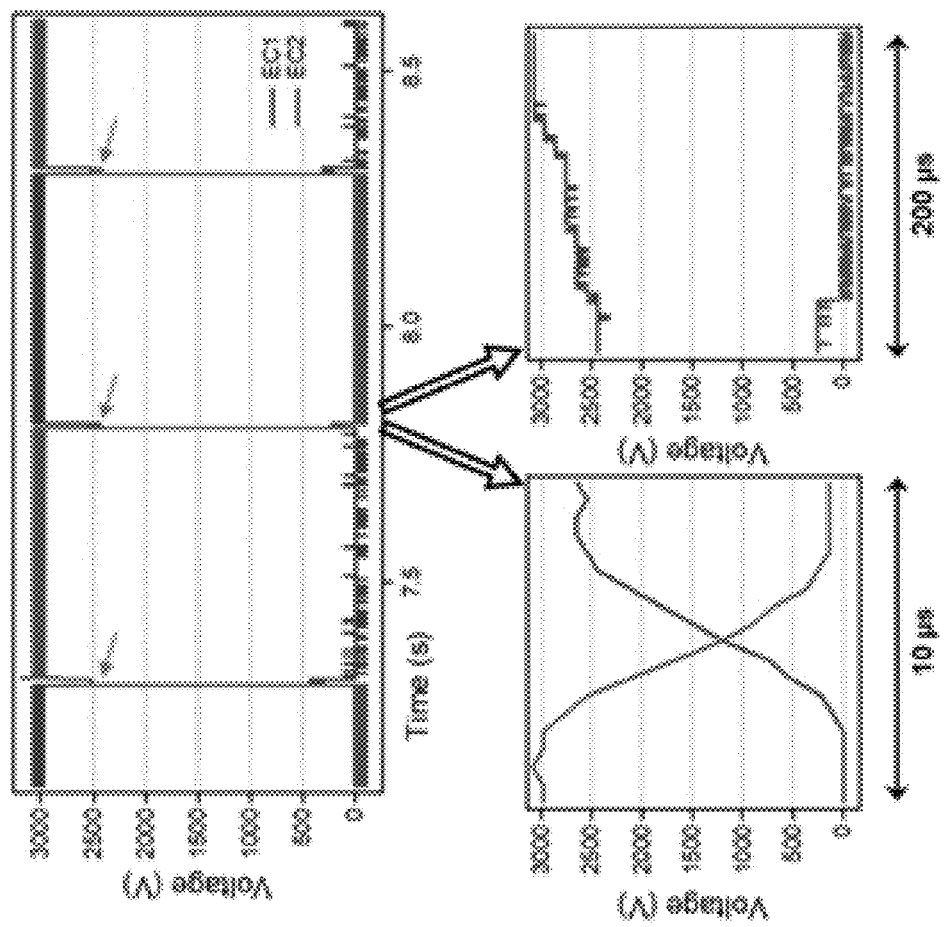

FIG. 8C shows Voltage change of two coupled EC stacks wired in a charge transfer circuit, the two EC stacks go through active antiphase ECE, under 1.0 Hz frequency. The three green arrows indicate active charge transfer where voltage of one capacitor rapidly decreases, while voltage of the other capacitor quickly increases. The two steps of charge transfer (bottom left) and fully charging to V0 (bottom right) are deliberately separated by a 10 ms time interval.

Figure 9B:
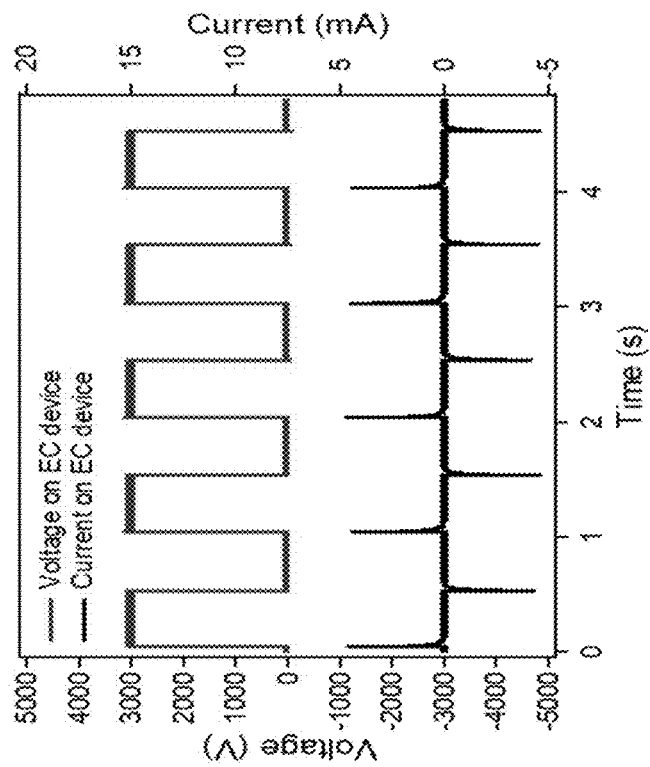
Figure 9A:
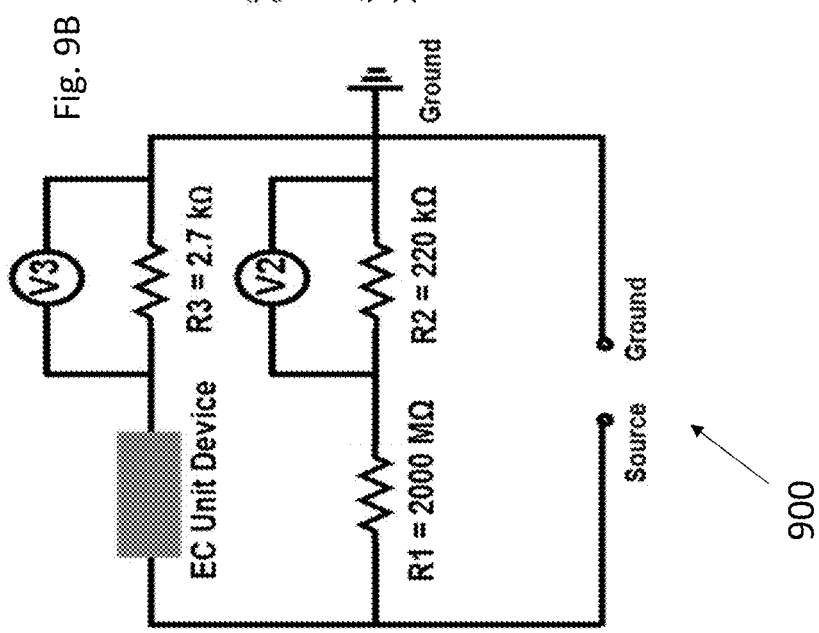

FIG. 9A shows the voltage divider circuit employed to measure electric current and voltage for calculation of electric power consumption FIG. 9B shows measured voltage and current signal on the EC device.

Figure 10A:
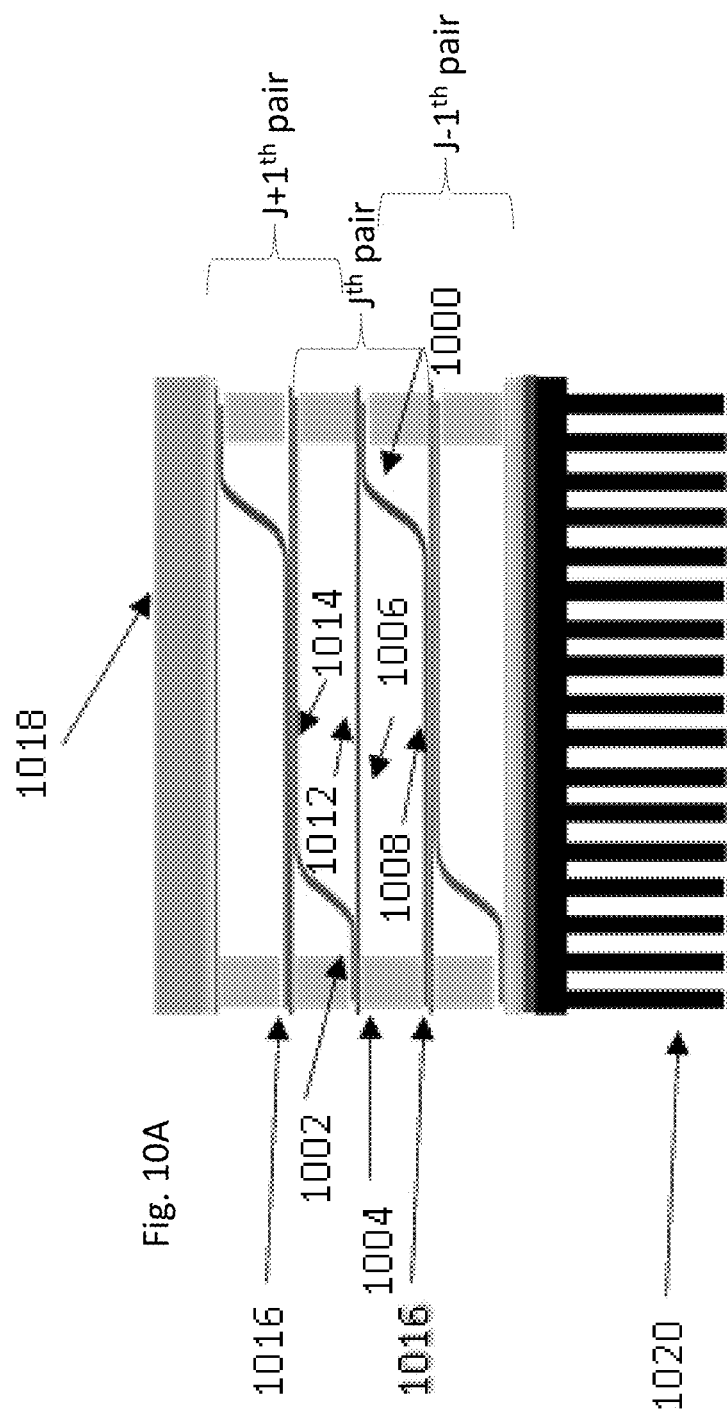

FIG. 10A shows schematic of a 4-layer cascade cooling device working under temperature span close to zero. A fin cooler was attached to the heat source, and a thick Aluminum block (6.3 mm) was the heat sink. A heat flux sensor (purple layer) was attached to a cooling fin placed beneath the device heat source laminate. Thermal conductive paste was applied, and the sensor is used to measure heat flux drawn by the device.

Figure 10B:
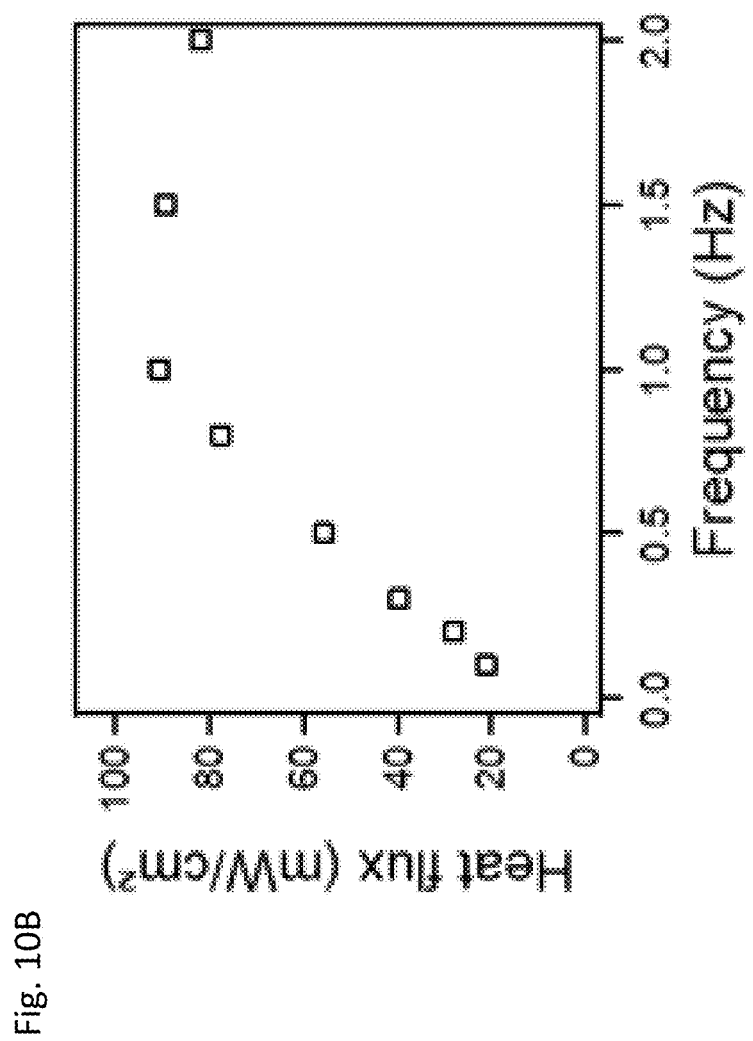

FIG. 10B shows measured time-averaged heat flux value plotted as a function of frequency.

Figure 10C:
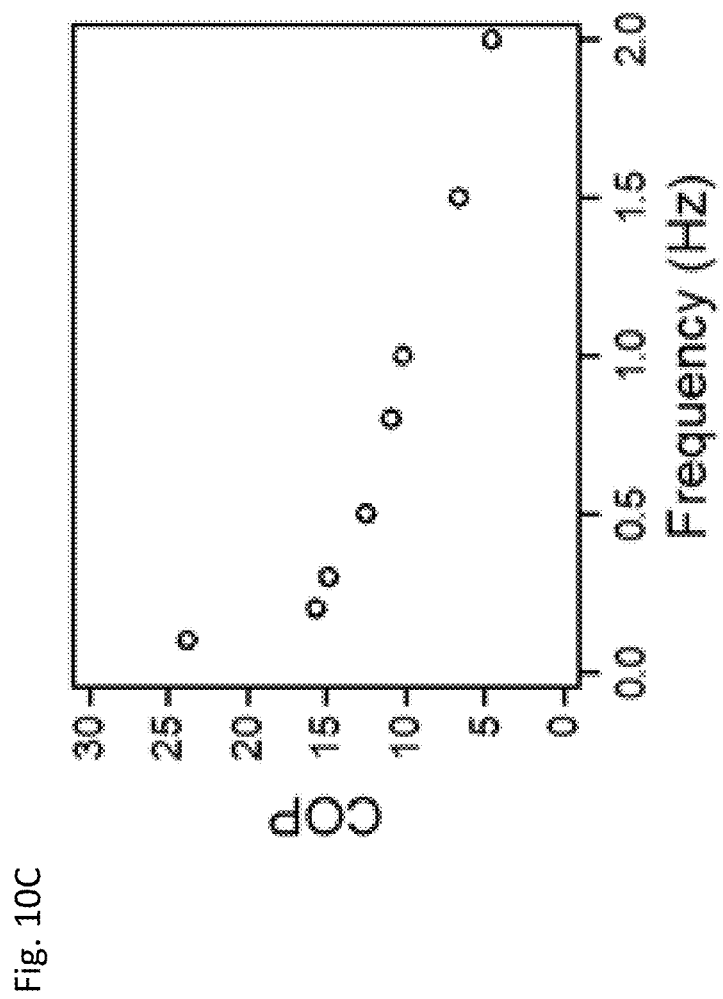

FIG. 10C shows calculated COP values of cascade cooling device, under different frequencies of operation.

Figure 10D:
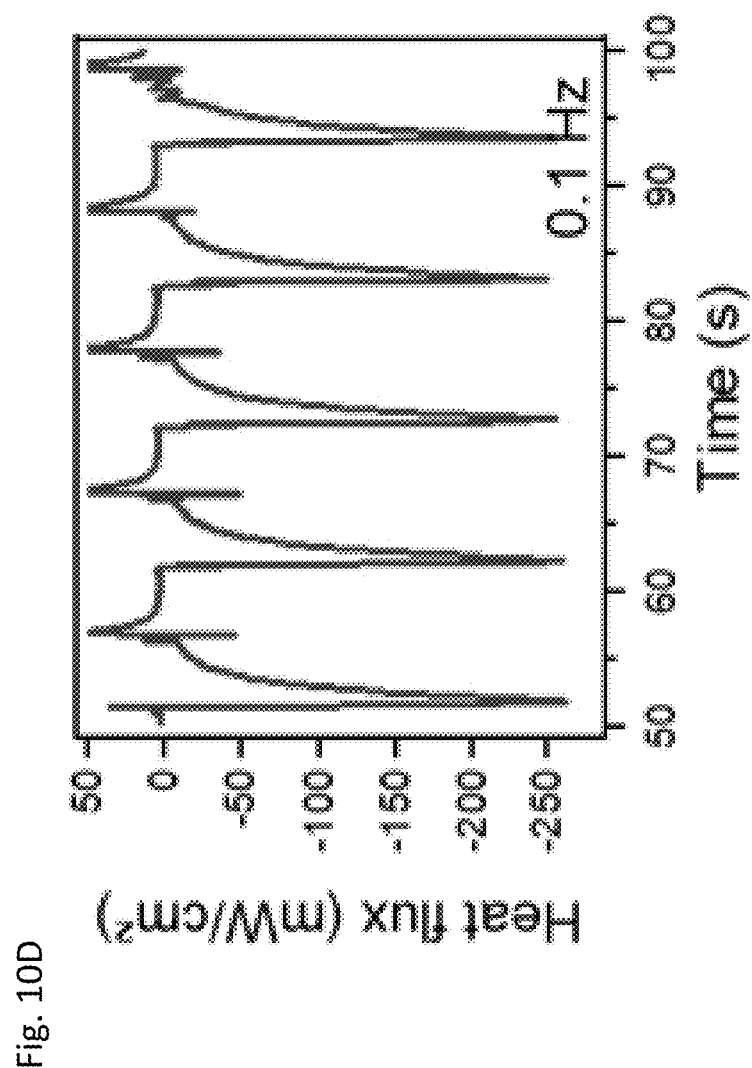
Figure 10E:
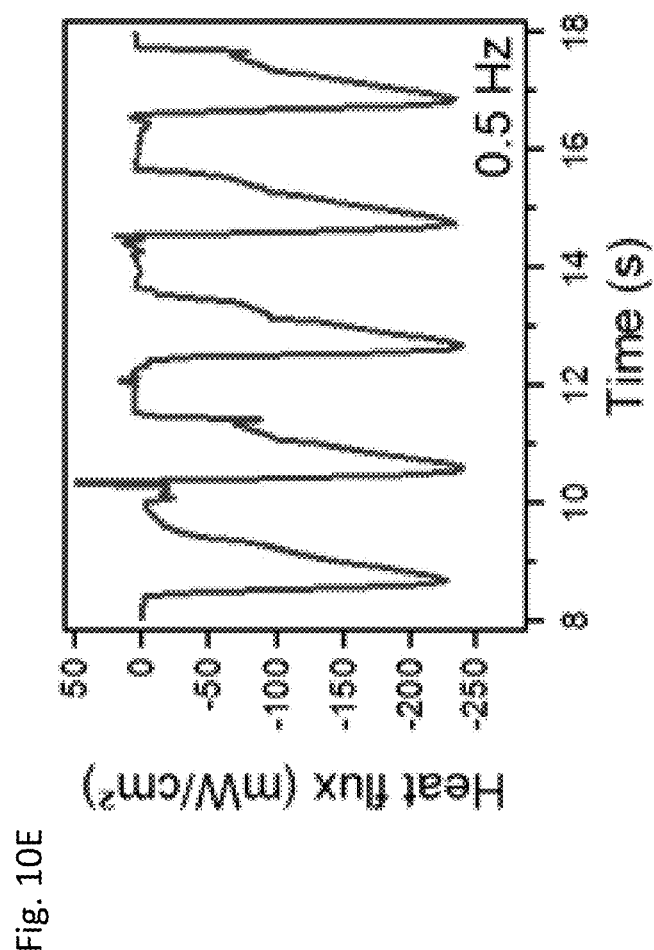
Figure 10F:
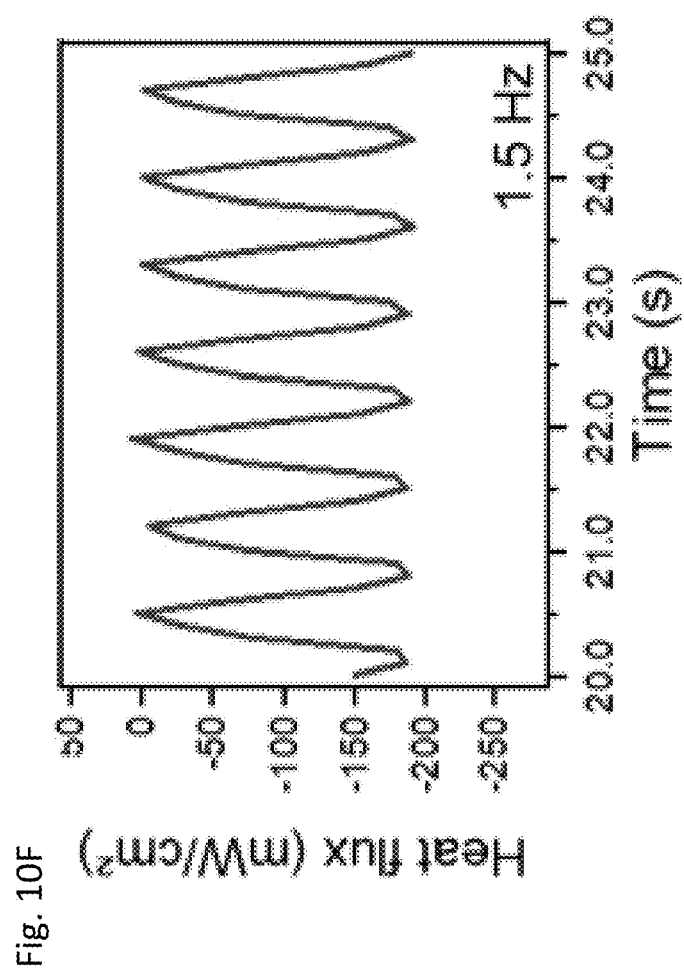

FIG. 10D-10F shows measured stable heat flux of the cascade device with an applied electric field of 60 MV/m and frequency of 0.1 Hz (FIG. 10D); 0.5 Hz (FIG. 10E) and 1.5 Hz (FIG. 10F).

Figure 11A:
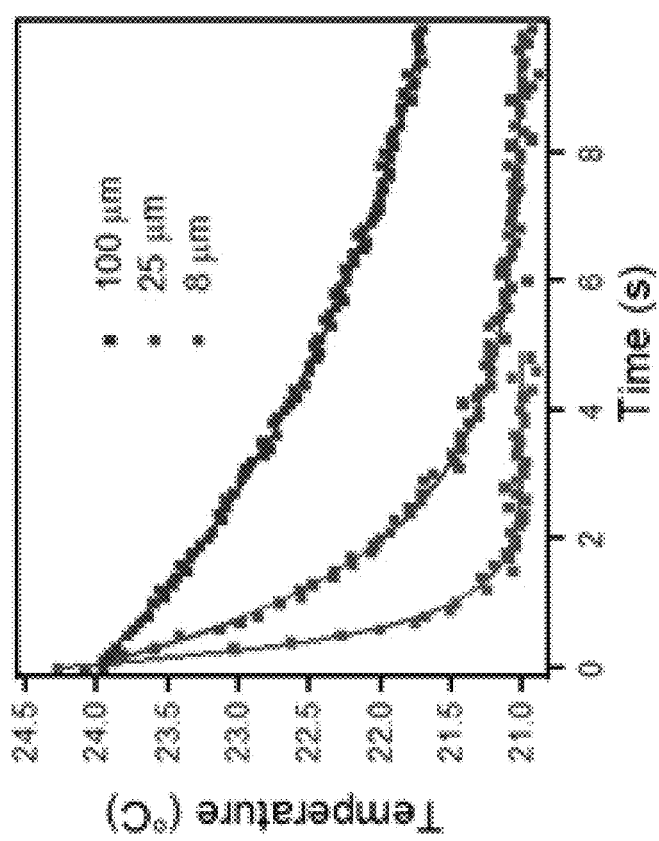

FIG. 11A shows cooling temperature profile (dot, experimental data; solid line, fit data) of three EC polymer films with specified thickness. The three EC films experienced adiabatic temperature change of ~3 K, and cooled down to room temperature through conduction with ambient air.

Figure 11B:
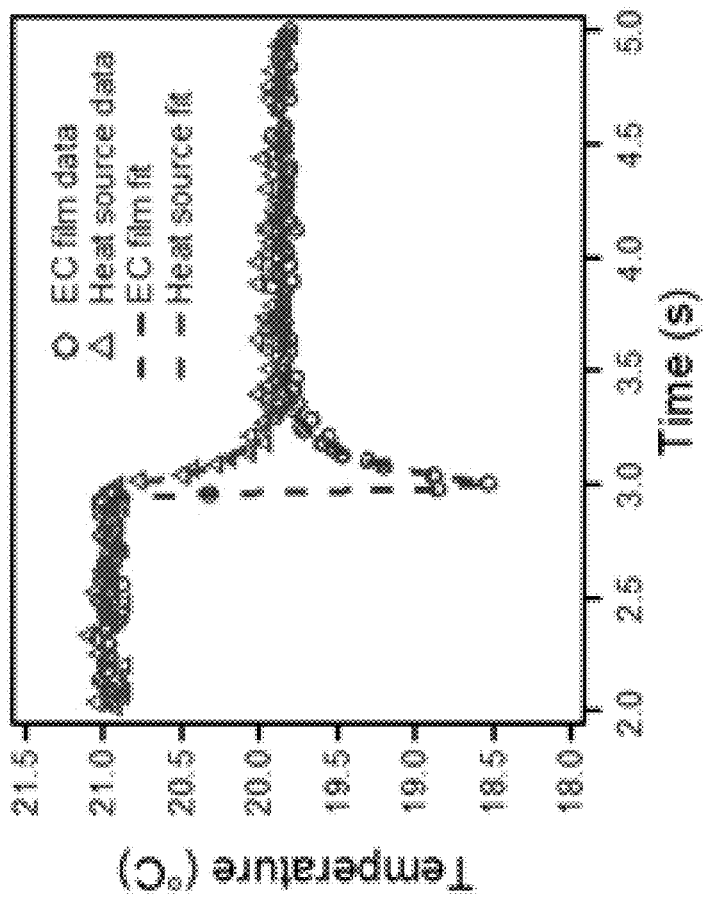

FIG. 11B shows experimental data (discrete marker) and fit result (dashed line) of temperature profile of laminate sheet (red) and EC polymer stack (blue) in a cooling cycle upon the removal of a 55 MV/m electric field; the laminate and EC polymer stack were electrostatically binded with a field intensity of 20 MV/m.

Figure 11C:
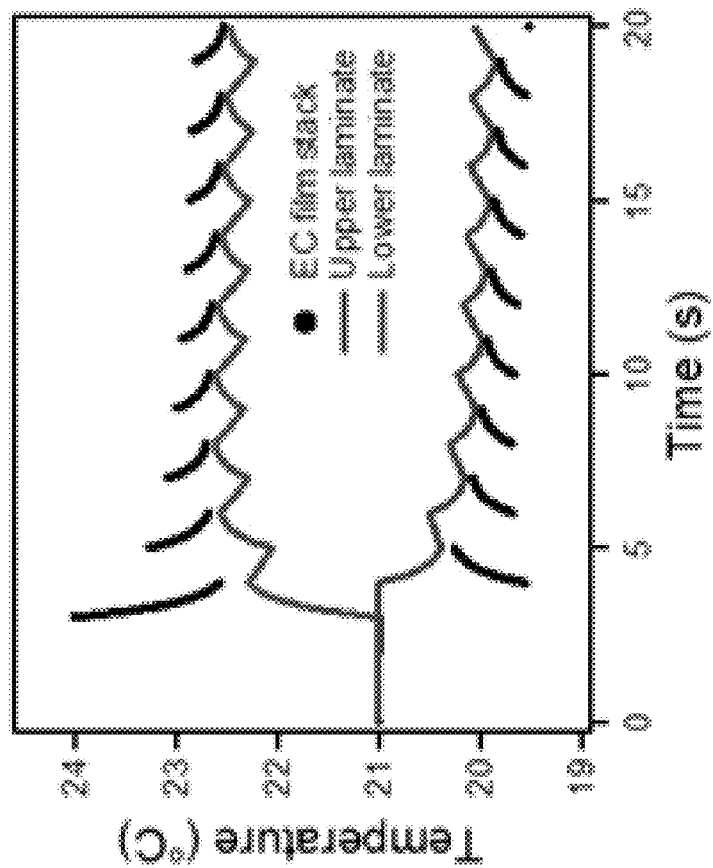

FIG. 11C shows numerical simulation result of a unit EC device operated under electrocaloric field of 60 MV/m, electrostatic field of 16 MV/m, at 0.5 Hz frequency.

Figure 11D:
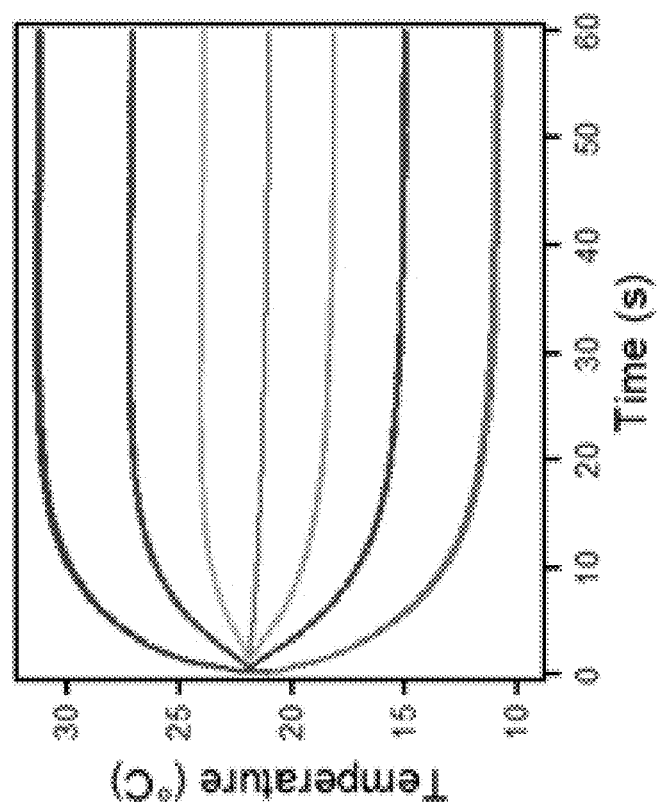

FIG. 11D shows numerical simulation result of a six-layer, cascade device under electrocaloric field of 100 MV/m and electrostatic field of 20 MV/m, at 4.0 Hz frequency. Each curve represents the temperature profile of a laminate sheet from the bottom to the top in the device.

Figure 12:
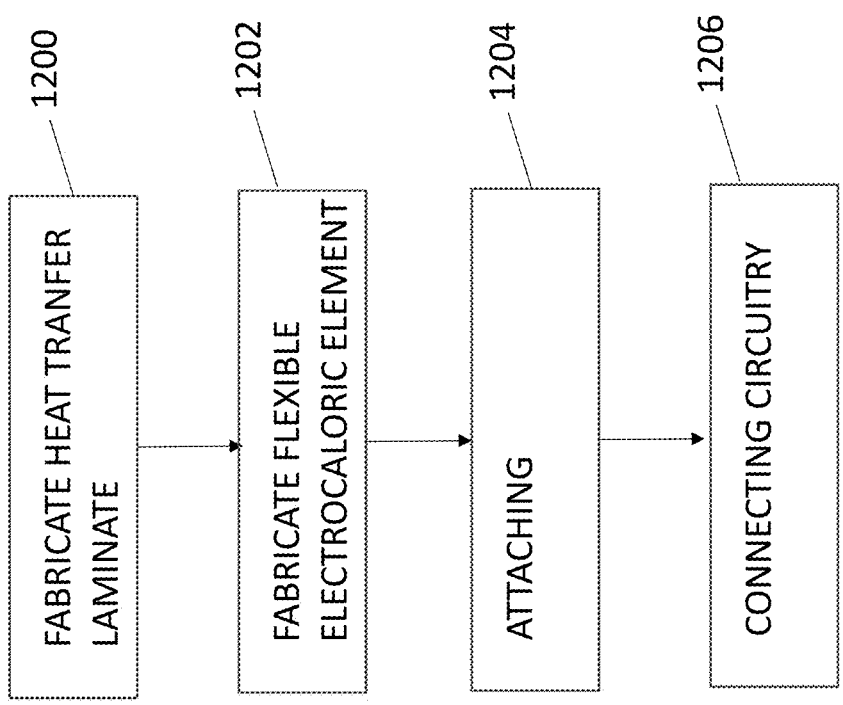

FIG. 12 illustrates an example method of making a device according to embodiments described herein.

Figure 13:
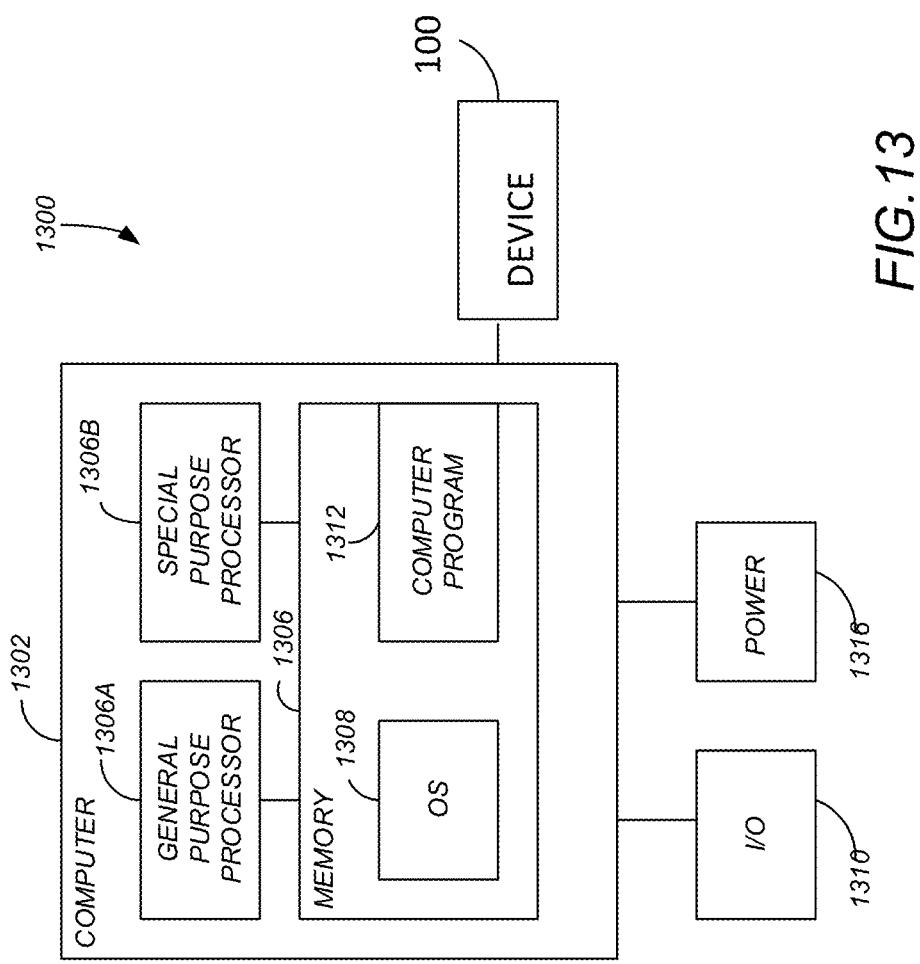

FIG. 13 illustrates an example processing, computer, hardware, and/or software environment/system for e.g., controlling a device according to embodiments described herein.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 2A:
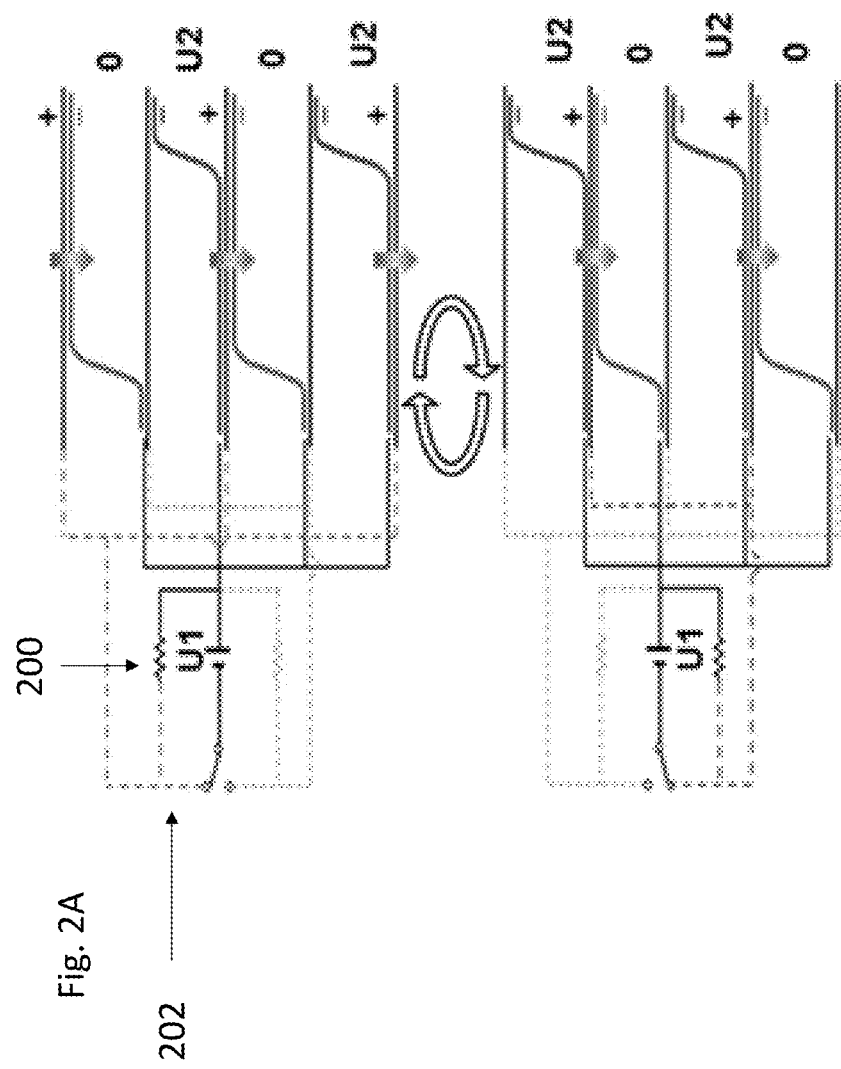
FIGS. 2A-2D. Operational mechanism of a 4-layer, cascade-structured cooling device.

Embodiments described herein comprise EC cascade system with direct heat exchange between neighboring EC elements operating in antiphase, expanding the overall device temperature span beyond the $\Delta T_{ECE}$. IN various examples, the EC elements are actuated by electrostatic force in antiphase pairs and in sync with the ECE operation, as illustrated in FIGS. 1A and 2A. Importantly, this compact design also leads to improved heat-pumping performance at large temperature spans.

1. Example Cascade EC Device Structure and Implementation Principles

Figure 5A:
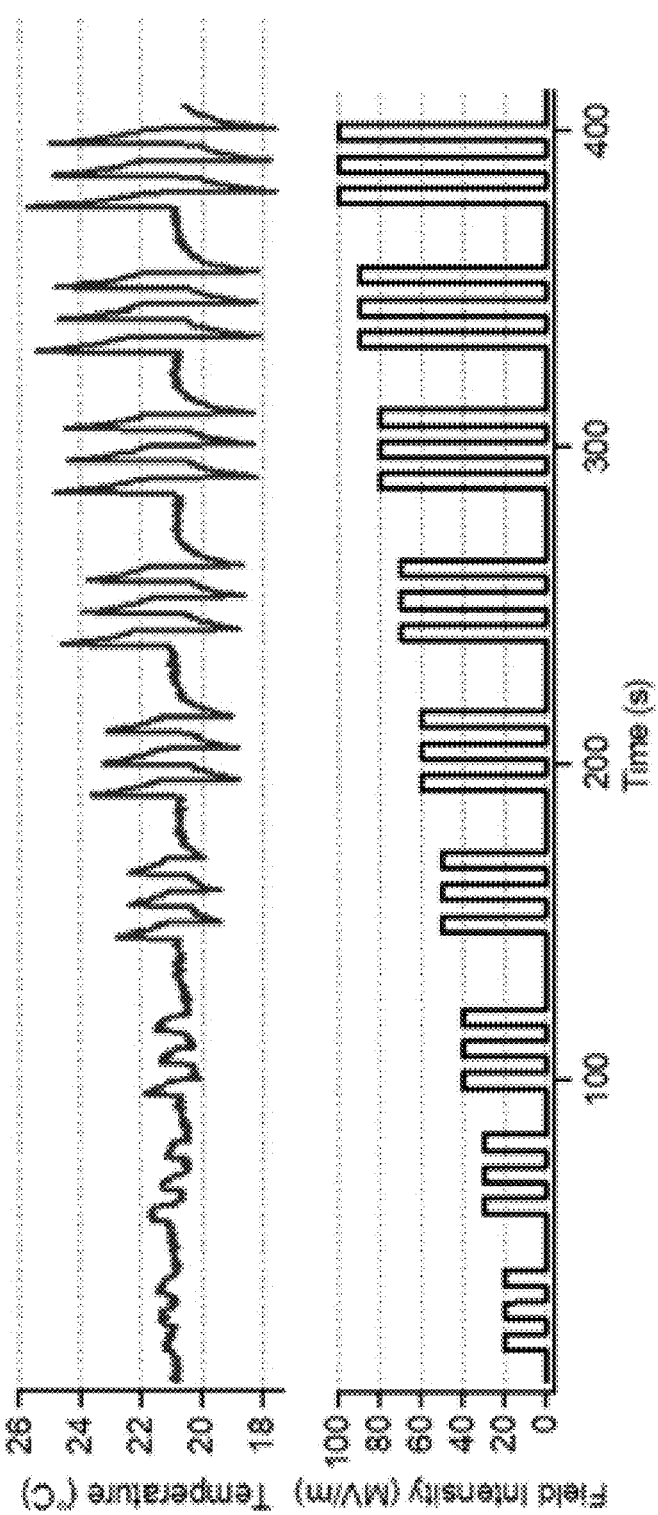
FIGS. 5A-5C.
Figure 5C:
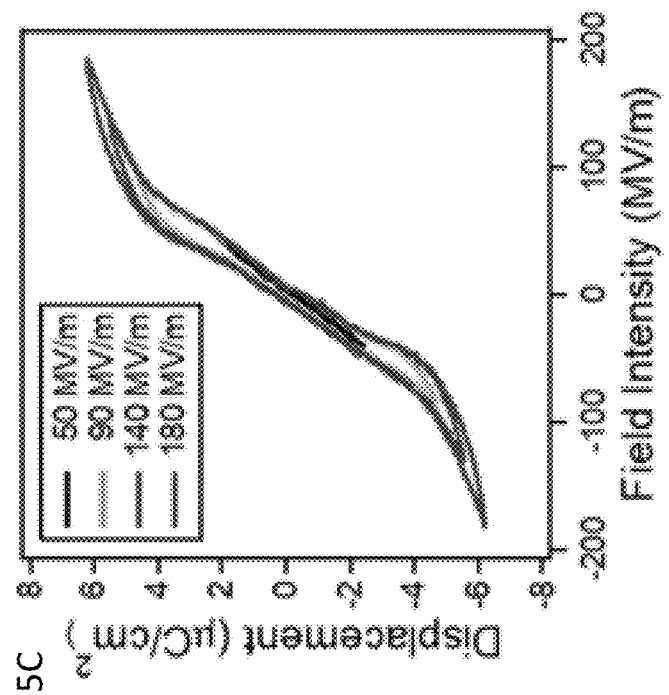
Figure 5B:
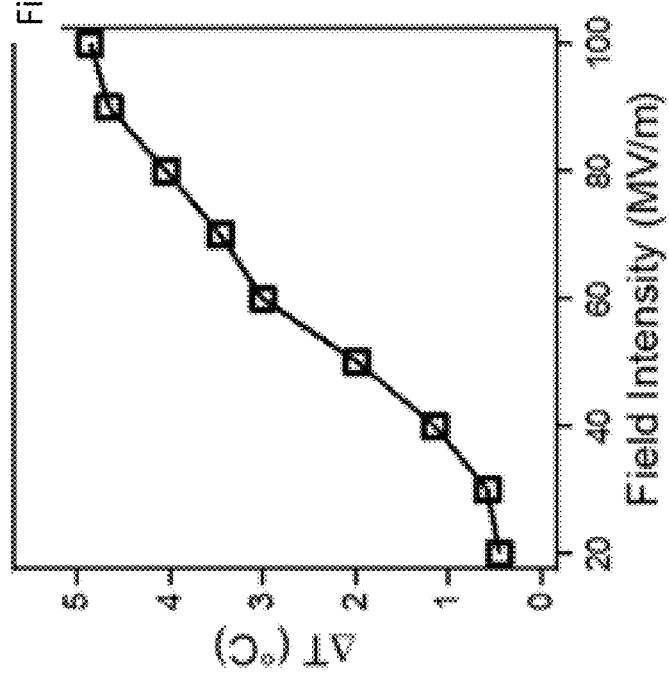

The P(VDF-TrFE-CFE) (60/32/8 mol %) relaxor ferroelectric terpolymer is chosen as the EC material for this study. Single-walled carbon nanotubes (CNTs), as flexible electrode, was spray-coated onto the two surfaces of a 50 μm-thick terpolymer film. Two of such CNT coated films were laminated together to form a 2-layer EC polymer stack film (FIG. 1B). The embedded middle CNT electrode of the stack serves as anode, and the two external CNT coatings as cathode to apply a voltage U2 for ECE across both P(VDF-TrFE-CFE) films in the stack. The resultant soft capacitor stack has an active EC area of 5 cm by 2 cm, as defined by the effective overlap region of the CNT electrodes. The $\Delta T_{ECE}$ of the stack increases with the voltage applied. At 3000 V, corresponding to an electrical field of 60 MV/m in the EC films, a $\Delta T_{ECE}$ of 3.0 K can be reliably achieved (FIGS. 5A-5C).

Figure 6A:
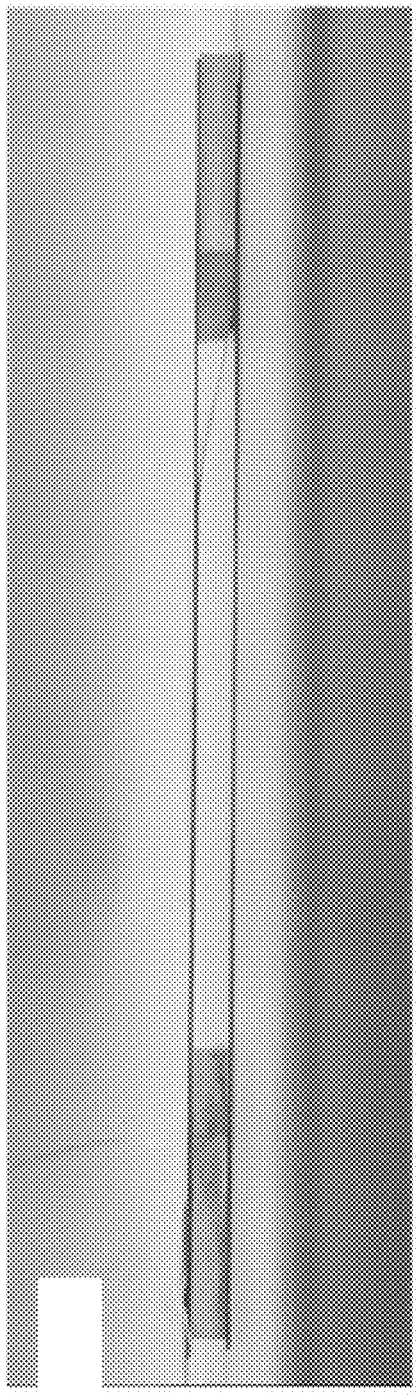
FIG. 6A is an image of a unit EC device. Two electrode laminates are separated by two 3 mm thick PDMS spacers. The EC polymer stack is in contact with the upper electrode laminate at the moment.
Figure 6B:
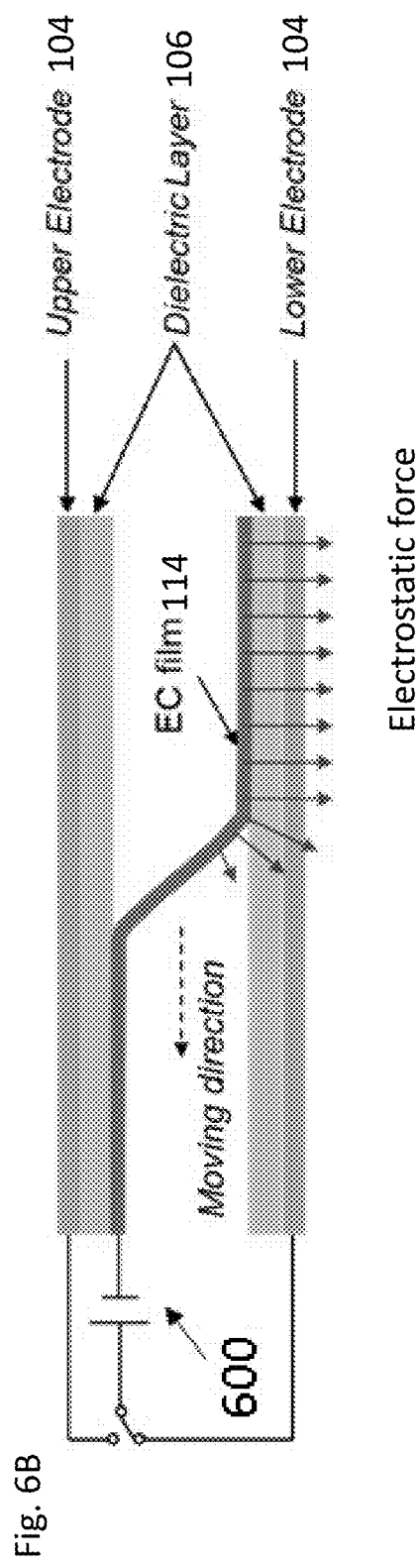
FIG. 6B is an illustration of a unit EC device (not drawn to scale). The relay guides the power to the lower electrode, and the electrostatic force between the EC film and the lower electrode pulls the EC film down. The film moves leftward like a flexure in a side view.
Figure 6C:
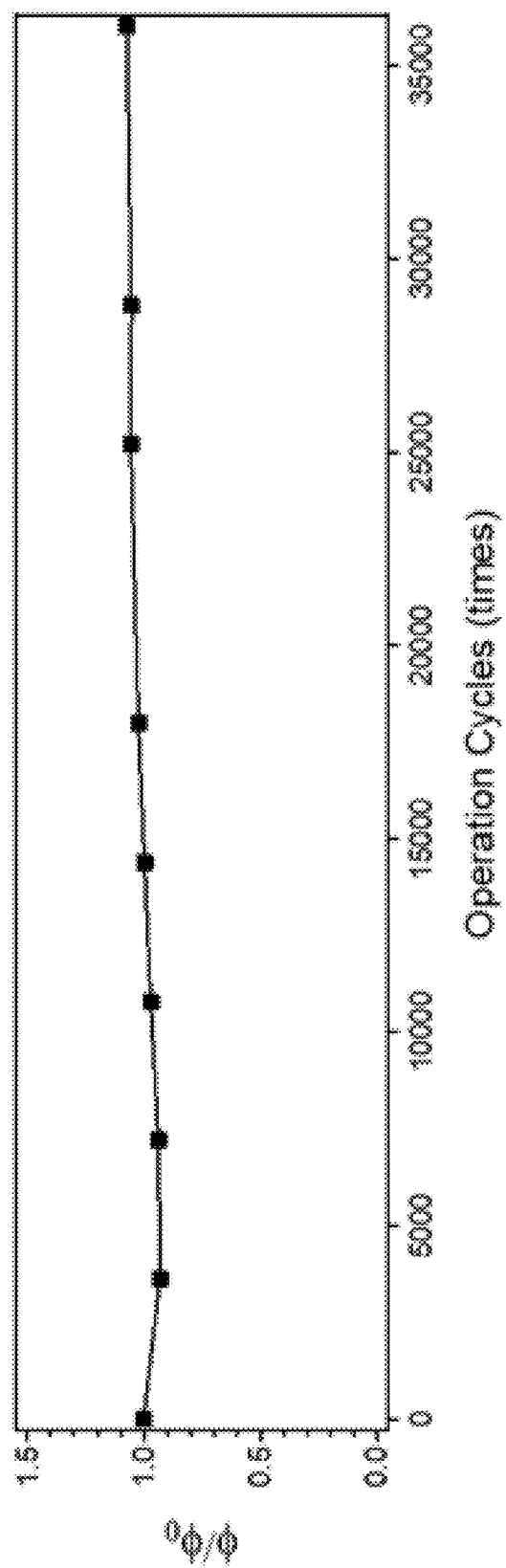
FIG. 6C shows measured unit device cooling heat flux ($\phi/\phi_0$) during consecutive 10-hour operation (36,000 cycles) under 50 MV/m at 1.0 Hz.

An example EC unit device in this report is composed of two laminated sheets that are separated by a 3-mm-thick PDMS spacer, with a EC polymer stack that is mounted in between the two laminate sheets (see FIG. 6B)[24]. Four such EC unit devices are cascaded together, with neighboring unit devices sharing one laminate sheet as displayed in FIG. 1A. The cascade device consists of 4 individual EC film stacks (referred to as 1, 2, 3, 4, in FIG. 1A), as well as 5 laminates (labeled as a, b, c, d, e). During certain period of device operation, two conjugated adjacent EC film stacks (i.e. stack group (1,2), (2,3) and (3,4)) are electrostatically attached to one same laminated sheet from opposite sides, and temporarily form the so-called thermal tandem junction (FIG. 1A, right). The laminated sheet simultaneously serves as the heat sink of one EC stack and the heat source of the conjugated EC stack for heat transfer. The steel shim in the laminated sheet functions as an electrode for electrostatic actuation, and it is covered by dielectric Kapton tape on both sides. Each of the 4 EC stack films in the cascade device takes S-shaped position within its own EC element space, and is able to move up and down like a flexure spring, in response to electrostatic field change between the steel shim and outer CNT electrode of the EC stack. The EC stack film can be transported between the laminated sheets. FIG. 1C exhibits how EC stacks in a real device switch between their only 2 configurations, activated by electrostatic force, in typical operation cycles.

A DC voltage U1 is alternately directed to the steel shims of laminate set (a, c, e) and (b, d); the periodically changing electrostatic field across the Kapton tape drives the four flexible EC stacks to shuttle between the two sets of laminates (FIG. 2A). When voltage U1 is guided to laminate set (a, c, e), the electrostatic attraction shuttles all the four stacks towards the three charged shims (to be specific, 1 to a, 2&3 to c, 4 to e); and when U1 is switched to the counterpart laminate set (b, d), resistor in the circuit allows for swift discharging, which avoids unwanted remnant statics that obstruct stacks from moving towards the other laminates (1&2 to b, 3&4 to d). In one or more examples, devices composed of different layers of EC elements are capable of actuating under different frequencies. By simply tuning the magnitude of voltage U1, the Maxwell pressure, and thus the thermal contact between the EC stack film and its heat sink/heat source can be conveniently modulated[32].

Figure 7:
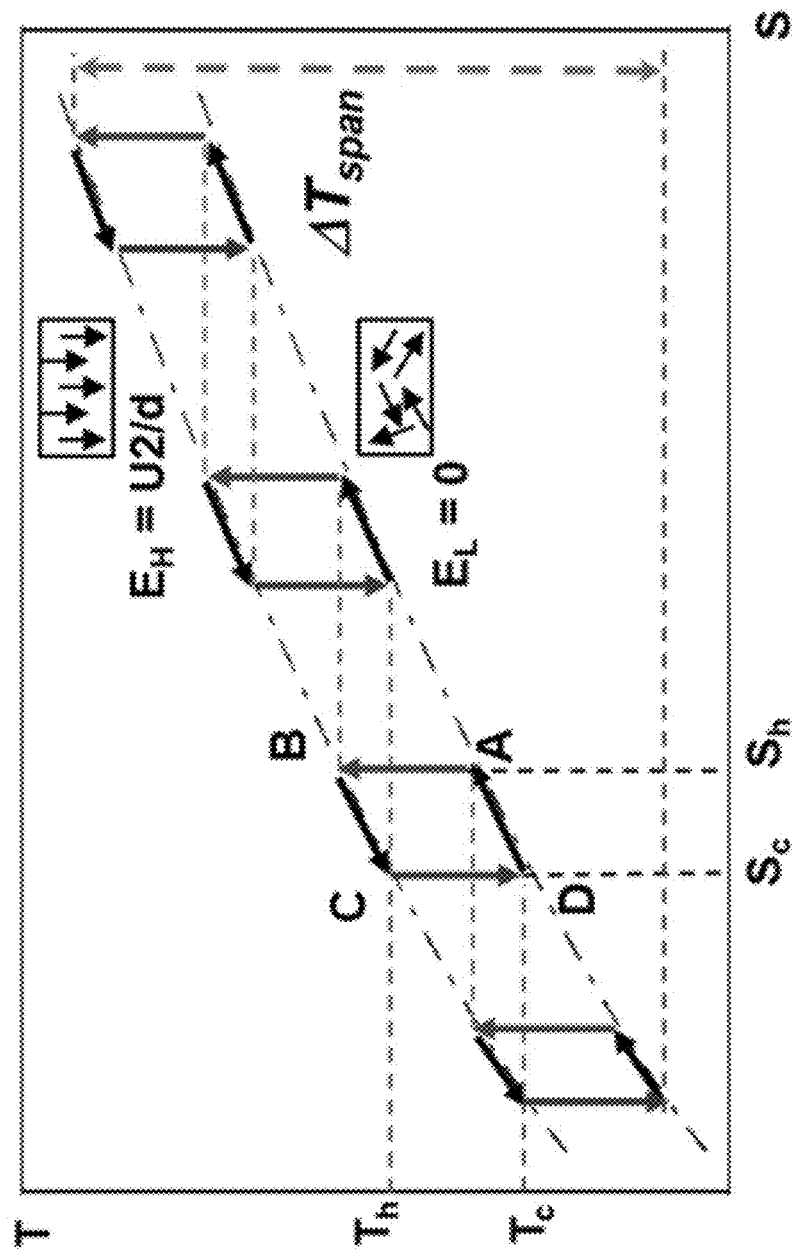
FIG. 7 shows thermodynamic refrigeration cycle driven by the electrocaloric effect of four EC polymer stacks, in a tandem cooling device. A→B→C→D signifies a Brayton cycle of a single EC polymer stack. Firstly, dipoles within the EC stack film are aligned upon the application of an external electric field (A→B), this is accompanied with rapid adiabatic temperature increase of the EC film. In the second step (B→C), the electric field is kept constant, and there is heat transfer from the EC stack to the heat sink laminate, leading to simultaneous temperature and entropy decrease. The electric field is then abruptly removed (C→D), bringing dipoles back to the state of disorder, and activate rapid adiabatic temperature decrease. Lastly, the electric field is kept at zero (D→A), and heat is absorbed from the heat source laminate to the EC stack, while the two are in thermal contact. The formation of the tandem junction joins the heat transfer processes of adjacent EC stacks (horizontal dashed green line), and helps to build up the overall temperature span (vertical dashed green line).

In one or more embodiments, the (e.g., precisely) synchronized electrocaloric cycling, along with movement of all the EC stacks in between their respective heat sink and heat source is essential for device cooling performance. Ideally, as is indicated in FIG. 2A, every EC stack is programmed to cool down and absorb heat while in touch with its upper heat source laminate, and heat up and reject heat while in contact with its adjacent lower heat sink laminate. The system operation principle (FIG. 2B) is as follows: (i) electrostatic actuation of EC polymer stack 1 towards laminate a, stack 2 and 3 towards laminate c, and stack 4 towards laminate e (the delay time for the EC stack to travel from one electrode laminate to the other is about 30 ms); (ii) electrocaloric cooling takes place on EC polymer stack 1 and 3, and at the same time electrocaloric heating occurs on stack 2 and 4; (iii) heat transfer takes place from laminate a to cooled polymer stack 1, from heated stack 2 through laminate c to cooled stack 3, and from heated stack 4 to laminate e (as demonstrated in upper half of FIG. 2A); (iv) electrostatic actuation of EC polymer stack 1 and 2 to laminate h, stack 3 and 4 to laminated; (v) electrocaloric heating effect on EC polymer stack 1 and 3, and electrocaloric cooling on stack 2 and 4; (vi) heat transfer from heated EC stack 1 through laminate h to cooled stack 2, and from heated EC stack 3 through laminate c to cooled stack 4 (as shown in bottom half of FIG. 2A). These six steps repeat continuously, quickly establishing non-overlapping, discrete Brayon thermodynamic cycles within EC stacks along the z-axis of the device (FIG. 7). Overall, heat is actively transported from the top laminate (a) to the bottom one (e), in a cascade style; ideally, a temperature gradient as high as $\Delta T_{ECE}$ times the number of EC elements can be generated.

Figure 2B:
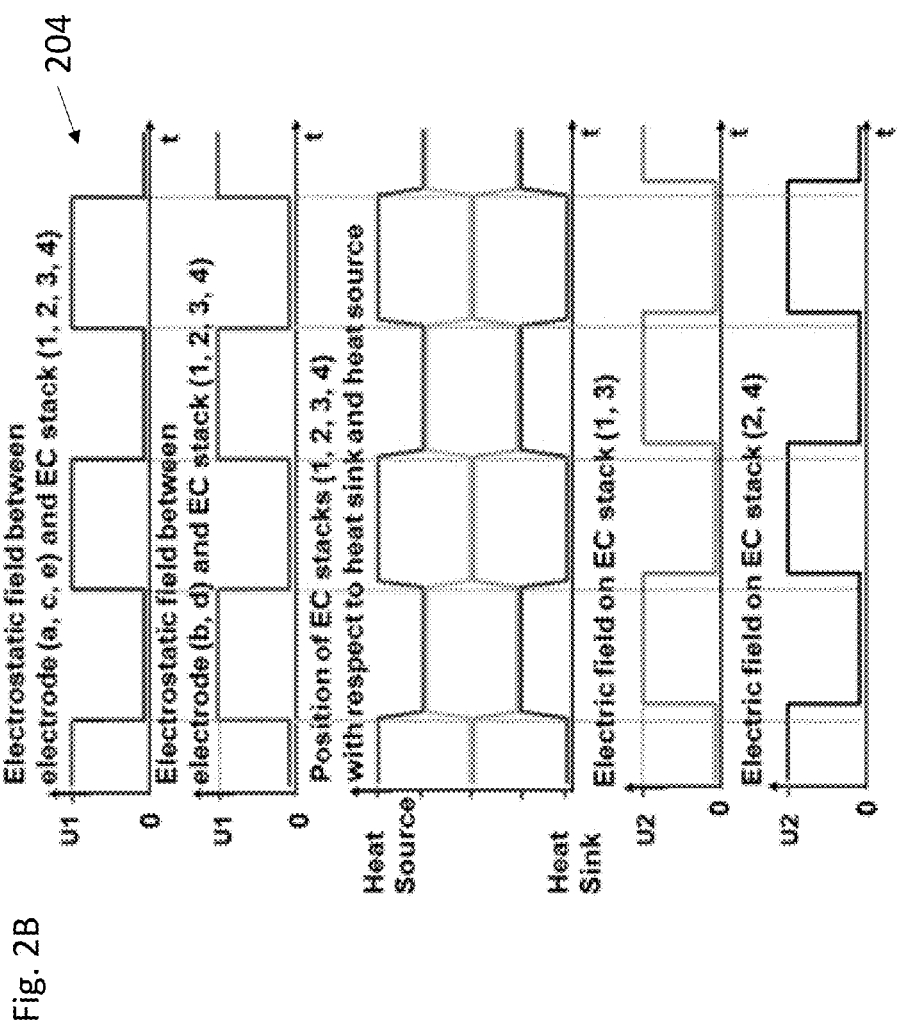
Figure 2C:
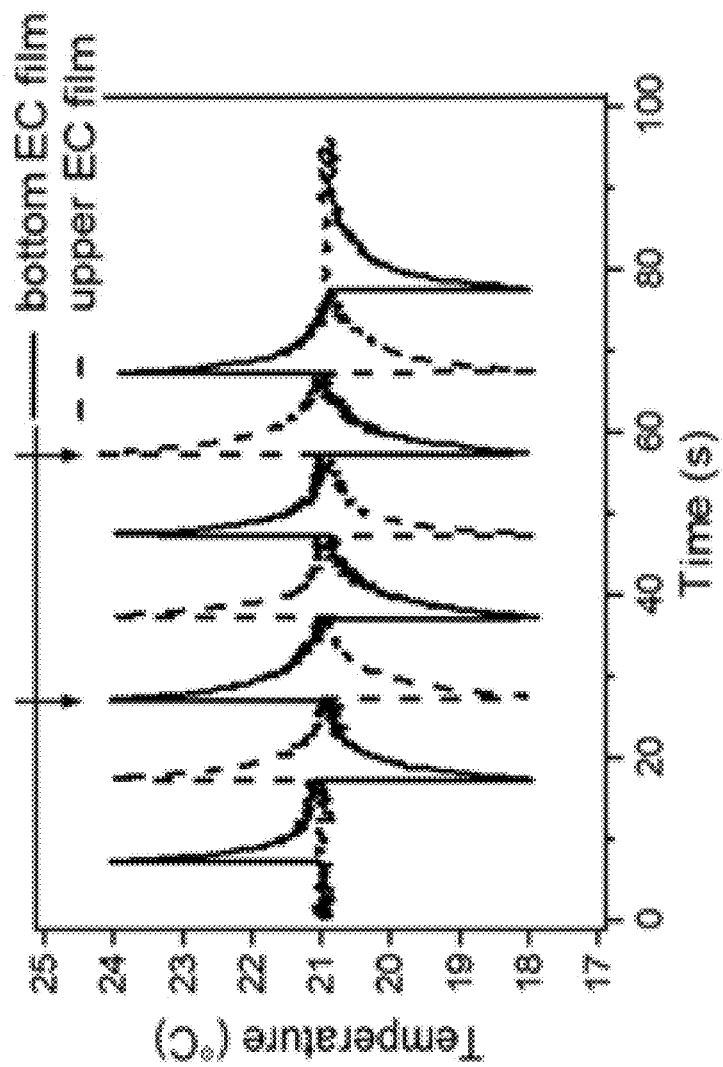
Figure 2D:
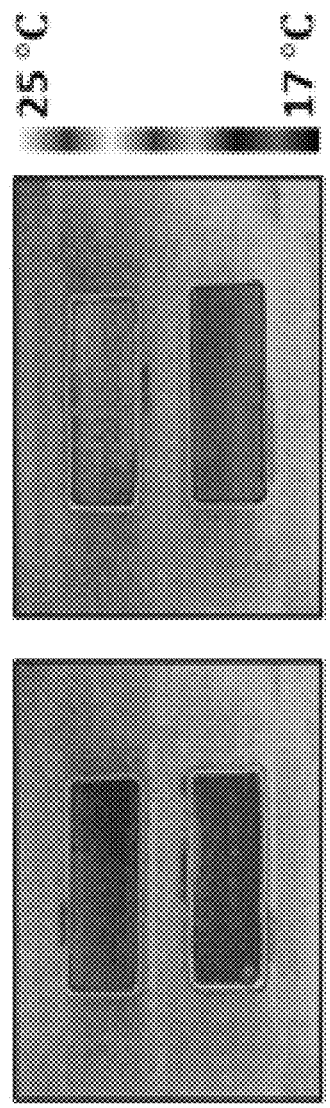

Electrical charges that are used to drive the electrocaloric effect of a EC capacitor stack can be recovered during discharging,[33] and the ideal destination for the recovered charges is a second EC capacitor that runs in antiphase. An energy recovery circuit a that actively transfers charges between two EC stacks is devised for the internal charge recovery (FIG. 8). The circuit induces antiphase EC effect on the two coupled elements. Though not compatible with unit cooling device containing a single EC element, the charge recovery circuit is a good fit for the cascade cooling devices comprising even number of EC stacks. Between 65~70% of the electrical energy is recycled between two conjugated EC stacks (FIG. 8), thus cutting down the EC energy consumption by ~⅔. As is shown in FIGS. 2C and 2D, two EC stacks in the energy recovery circuit alternately go through conjugated heating and cooling cycles; a sudden temperature change upon the application or removal of the EC voltage is followed by a slow, 10 s long heat transfer process with ambient environment until the temperature of the stack gets back to room temperature of 21° C. The charge transfer process is completed in less than 1 ms, which guarantees that the adiabatic electrocaloric heating and cooling effect of the coupled EC stacks take place almost simultaneously.

2. Example Cooling Capability and Efficiency of the Example Cascade EC Device Structure Described in Section 1

Figure 3A:
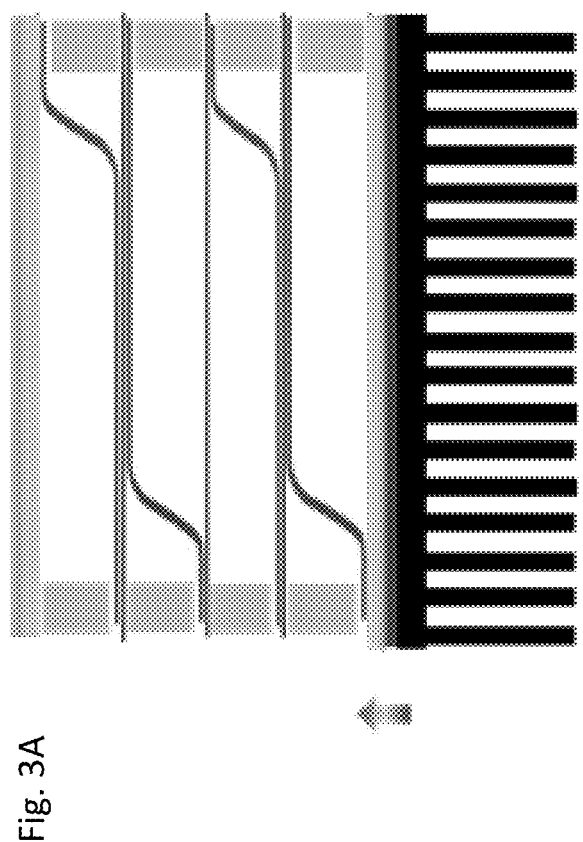
FIGS. 3A-3F. Cooling performance of the cascade device.
Figure 3B:
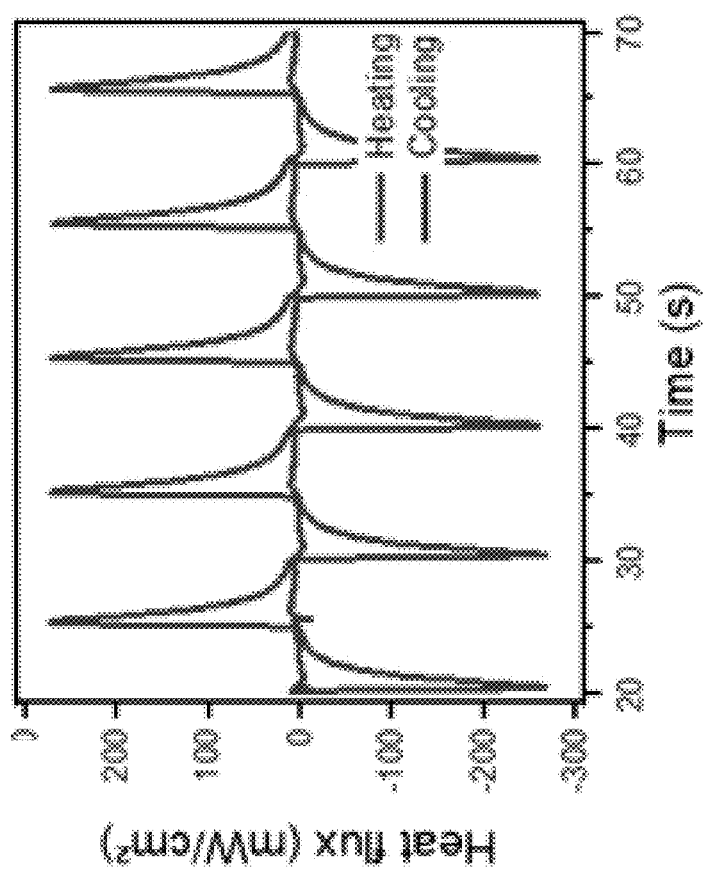
Figure 3C:
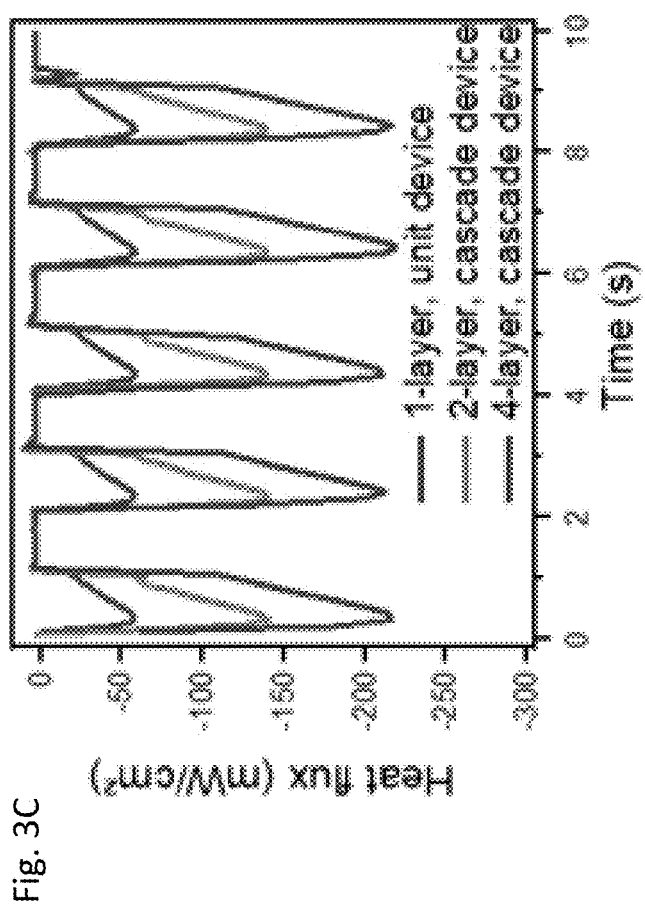
Figure 3D:
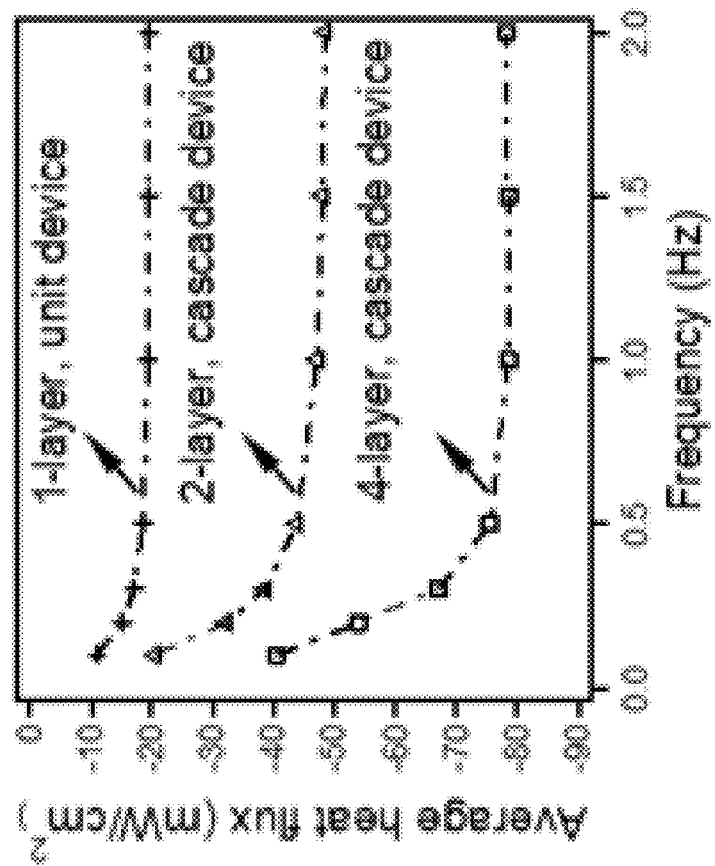

A thin film heat flux sensor attached to an aluminum cooling fin is placed beneath the cascade device heat source laminate (FIG. 3A), for in-situ heat transfer measurement. An electrocaloric field of 60 MV/m (3000 V applied) and an electrostatic field of 16 MV/m are applied during continuous device operation. The cascade device can be switched between heating and cooling modes, by flipping the device up side down, or through simply reverse the polarity of the DC voltage. Heat transferred in heating and cooling modes of a 4-layer cascade device exhibits stable and almost symmetric heat flux patterns (FIG. 3B), suggesting negligible Joule heating effect. Cooling heat flux patterns of 4-layer, 2-layer and unit cooling devices under 0.5 Hz operation frequency are shown in FIG. 3C, and a complete mapping of the average heat flux as a function of operation frequency and numbers of layers in the devices is demonstrated in FIG. 3D. A higher frequency generates higher cooling power, because the EC film stacks are cycled more frequently, meaning more EC effect taking place in a unit time. All the cooling devices render saturated cooling power when operation frequency exceeds 1.0 Hz, likely limited by the interface thermal conductivity. Cascade devices with more EC layers generates greater heat flux under the same applied EC field intensity and operation frequency (FIG. 3D). In a 4-layer cascade device operating at 60 MV/m electric field across the EC film, the cooling heat flux is 78.5 mW/cm$^2$, which is close to the AM1.5 solar radiation of 100 mW/cm$^2$. The measured temperature lift is 2.7 K.

Figure 3E:
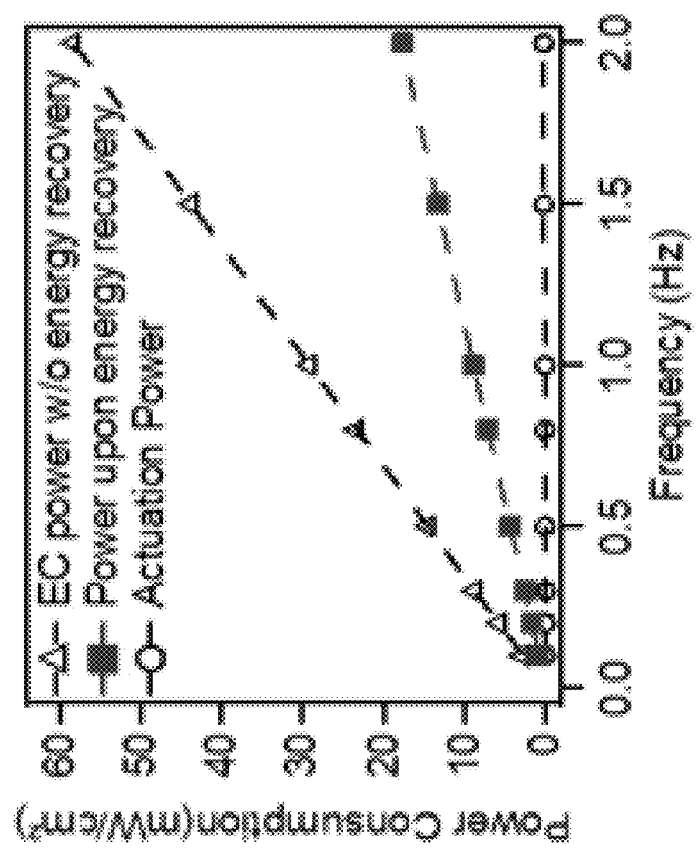

The 4-layer cascade EC device is driven by two separate circuits, hence energy consumption of the device is comprised of two parts: (i) energy consumed to generate the electrocaloric effect, and (ii) energy utilized to transport the EC stack films between their respective heat sink and heat source laminates. The electrical work done to power the EC effect on a unit device is calculated to be 7.3 mW/cm$^2$, under an applied electric field of 60 MV/m and 1.0 Hz frequency, based on the measured operating voltage and current (FIG. 9). With the energy recovery circuit actively regenerating ~70% of the electrical energy between every pair of EC stacks, the overall power consumption to drive 4 EC stacks in a cascade cooling device is lowered from 29.2 mW/cm$^2$ without charge recovery to 8.76 mW/cm$^2$ when internal charge recovery is implemented. Unlike most previous solid-state cooling devices that utilize a mechanical motor to move a cooling element to sequentially make and break the thermal contact with the heat source and heat sink (15, 21), our electrostatic actuation circuit provides a compact solution to effectively cycle multiple EC stacks; and with an operating current too small to be measured, the electrostatic actuation energy consumption was calculated, assuming an ideal RC circuit (FIG. 9). Energy consumption of a 4-layer cascade device under an electrocaloric field of 60 MV/m and an electrostatic field of 16 MV/m at frequencies from 0.1 to 2.0 Hz is summarized in FIG. 3E.

Figure 3F:
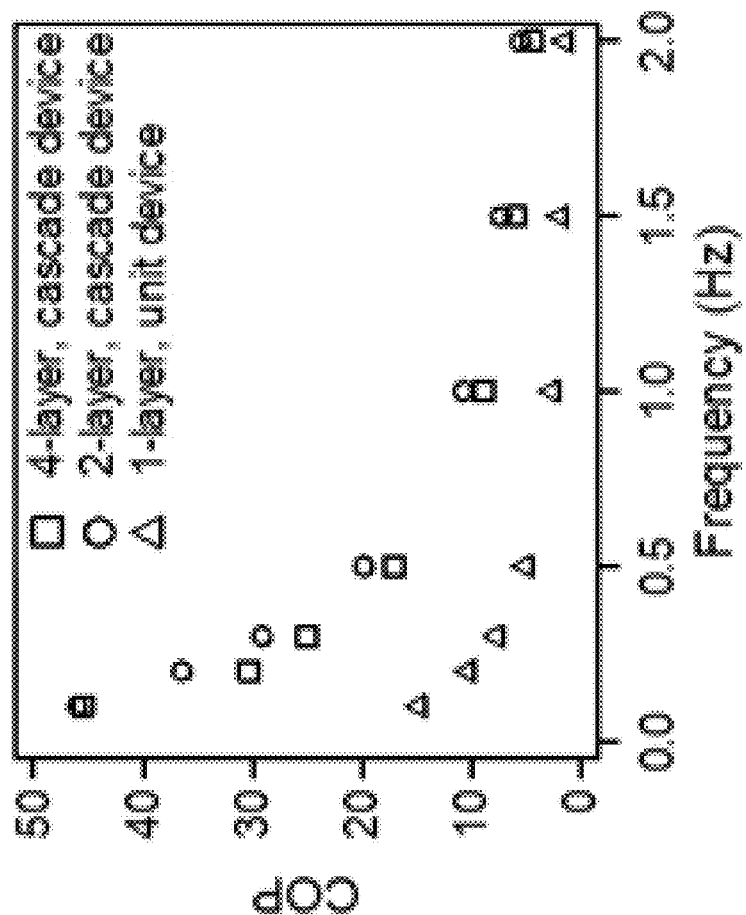

The effectiveness of the cascade-structured device with internal charge recovery is assessed in terms of COP, i.e. the total heat pumped from the load divided by the total electrical work used, or COP=$\overline{Q}/\overline{W}$. The COP value of the 4-layer cascade device descends as cooling power increases at higher frequencies; a COP of 9.0 can be achieved under the peak device cooling power of 78.5 mW/cm², when operated at 1.0 Hz with a temperature lift of 2.7 K. The 2-layer and 4-layer cascade devices show similar COP, both are higher than the unit cooling device (FIG. 3F). To demonstrate the maximum cooling capability of the 4-layer cascade device, the temperature span is kept close to zero through employing bulky, thermally-conductive heat sink and heat source (FIG. 10A). The measured peak cooling power is 90.6 mW/cm² at zero temperature span, with a COP of 10.4. This is obtained at 60 MV/m electric field (3000 V applied voltage) and 1.0 Hz frequency.

3. Example Expanded Temperature Span within the Cascade EC Device

Figure 4A:
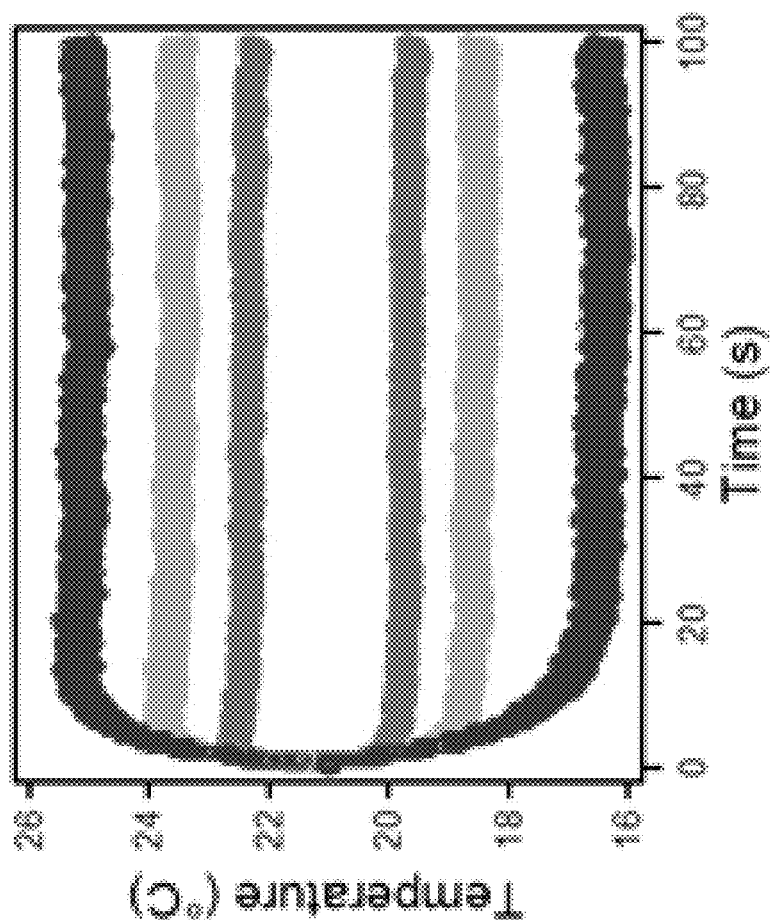
FIGS. 4A-4F. Temperature span and cooling effectiveness of the cascade cooling device.
Figure 4B:
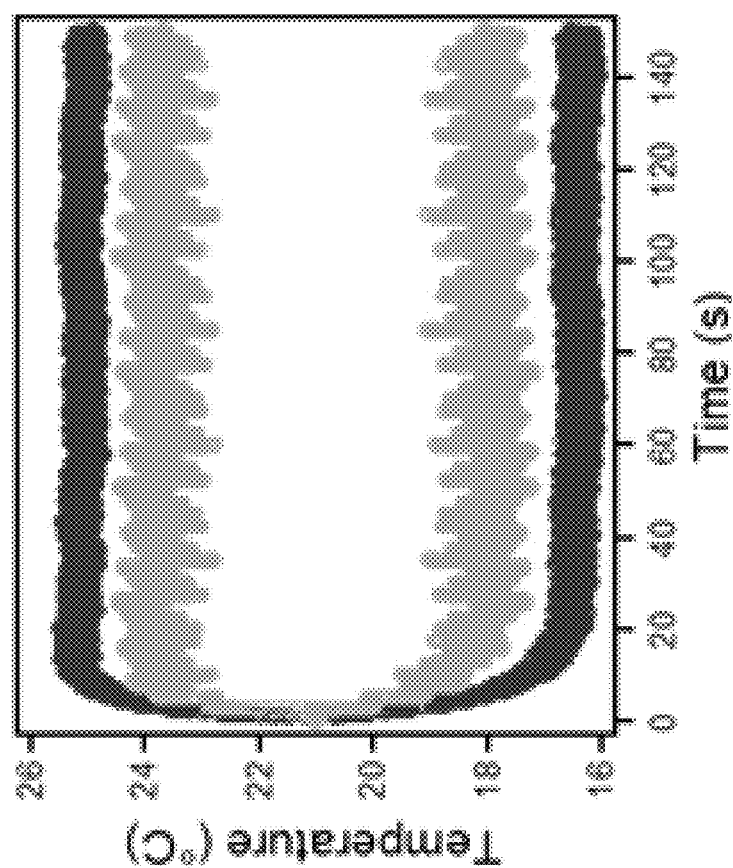

Device temperature span is another important criterion to evaluate a cooling device. Larger temperature span is generally obtained at lower heat flux, and the maximum temperature span is measured when the heat flux is near zero, i.e. at the no-load condition. To minimize the heat flux, we replaced the top and bottom steel shim electrodes with 120 µm thick polyethylene terephthalate (PET) films to minimize the thermal mass of the heat source and sink. The PET films were coated with a thin layer indium tin oxide (100 nm thickness) as the outer electrostatic actuation electrodes. The device was not attached onto any heat load. Infrared camera was employed to monitor the temperature of the freestanding heat sink and heat source laminates. Real time temperature profiles of 4-layer, 2-layer cascade devices, and unit device under the electrocaloric field of 60 MV/m and electrostatic field of 16 MV/m at 1.0 Hz are shown in FIG. 4A. The control unit device exhibits a $\Delta T_{device}$ of 2.8 K, whereas the 2-layer and 4-layer cascade devices raise the $\Delta T_{device}$ to 5.5 and 8.7 K, respectively. The time-temperature change paths of the three devices largely overlap, while the devices with more cascade layers take longer time to their equilibrated maximum temperature span. The operation frequency, which was shown earlier to determine heat flux value of the devices, also affects the temperature span, as well as the temperature fluctuation at the equilibrium state: the no-load $\Delta T_{device}$ of the 4-layer cascade device is 6.2 K at 0.5 Hz, and exhibits large undulation (FIG. 4B). The same device operating at 1.0 Hz does not show much smaller undulation.

Figure 4C:
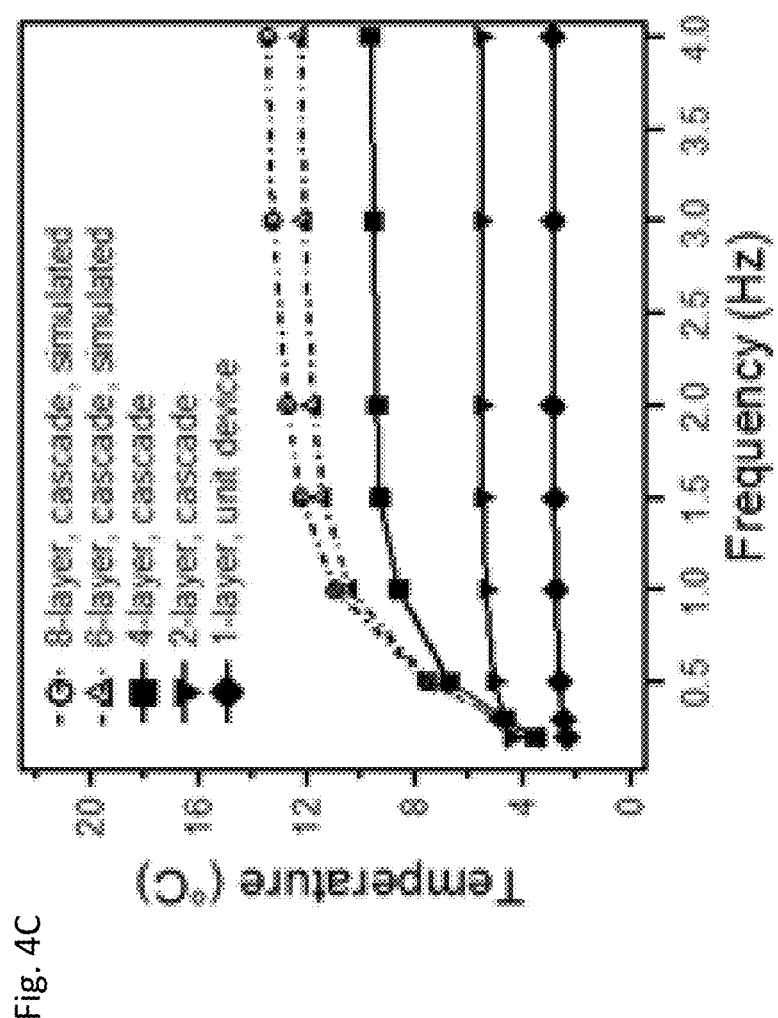
Figure 4D:
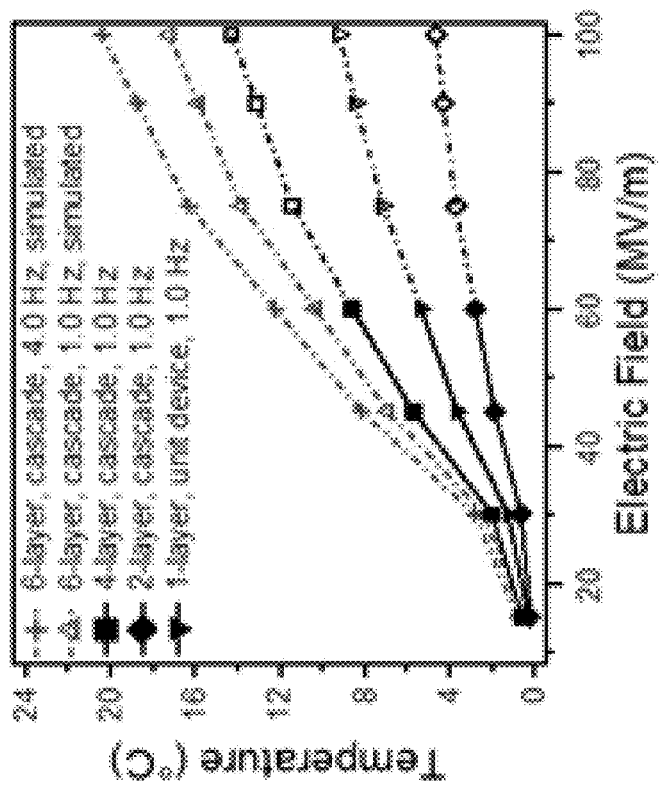

Building devices containing more cascade layers is a practical solution to acquire greater $\Delta T_{device}$. In this work, we have constructed devices with up to 4 layered EC elements, and the experimental result has shown an over 3-fold elevation in device temperature span, from 2.8 to 8.7 K. A simple numerical model is used to generate fitting curves that capture the features of the experimental data, and are used to predict the temperature profile of devices with more EC elements (>4) in the operation frequency range from 0.1 to 4.0 Hz. The simulated temperature profiles agree well with the experimental data (FIG. 11), and are thus used to predict the performance of cascade devices with large number of layers. The no-load temperature span is predicted to be ~12 K for a 6-layer cascade, and ~14 K for an 8-layer cascade device (FIG. 4C). The slow down of the increase of the temperature span with the number of cascaded layers is attributed to the aggravated heat loss to ambient air as results of the larger temperature difference from the ambient and increased number of interfaces. Minimizing the thickness of the laminate structure and employing a dielectric coating with high thermal conductivity should help cut down the parasitic heat loss and reduce the thermal resistance. Another approach to further increase the no-load $\Delta T_{device}$ is to increase the electric field across the EC polymer stack (FIG. 4D). At 100 MV/m, where $\Delta T_{ECE}$ of 5.0 K is generally obtained, over 20 K of no-load $\Delta T_{device}$ can be expected in a 6-layer cascade device operated at 4.0 Hz.

Figure 4E:
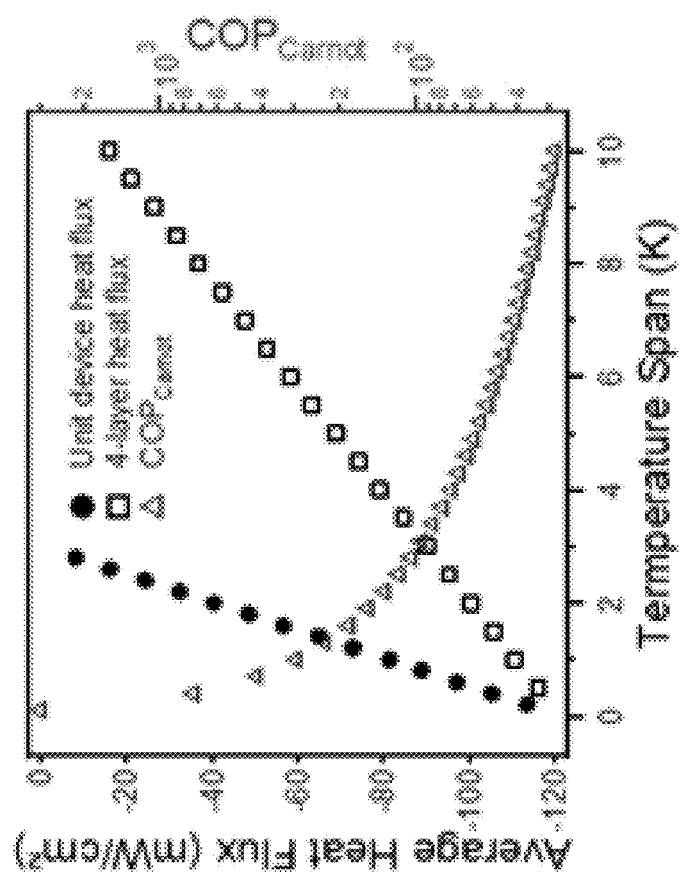
Figure 4F:
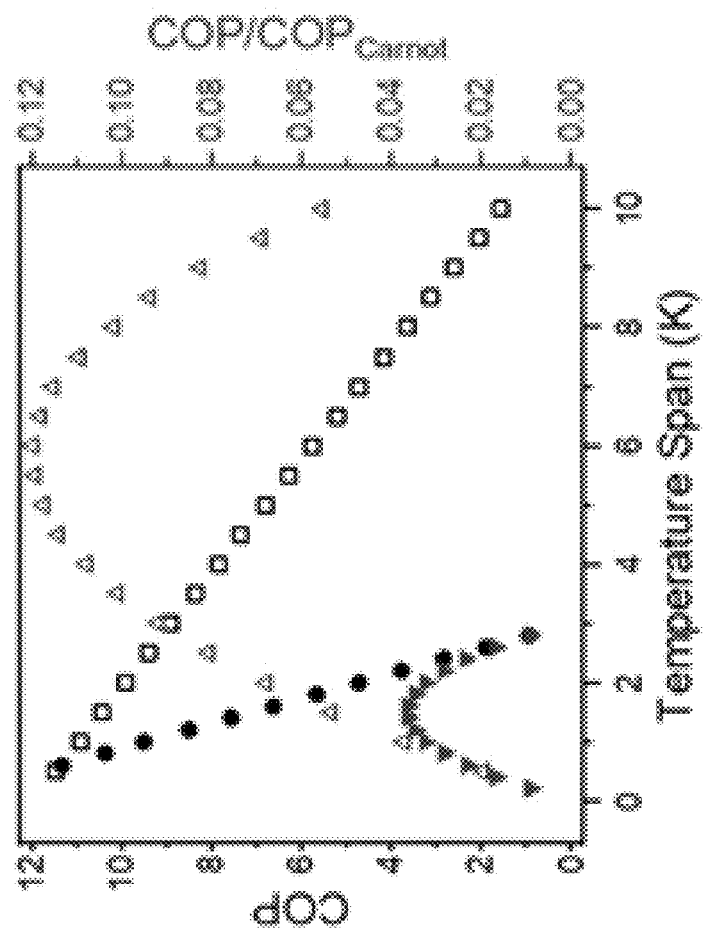

The temperature span of a cooling device is interwined with its heat flux and COP. We carried out simulation to correlate the COP, heat flux and $COP/COP_{Carnot}$ values of cascade cooling devices performed at different temperature spans. Heat capacities of the heat sink and heat source are assumed to be large enough that temperature of the heat sink and heat source are stabilized at specified value throughout the device operation. The adiabatic temperature change of the EC films is set at 3 K, and operation frequency is fixed at 1.0 Hz; the EC film and the laminated sheet do not necessarily reach thermal equilibrium during 0.5 s of thermal contact. An energy recovery ratio of 70% is used, based on the charge recovery described above for the cascade device. These simulation assumptions are made based on real device operation scenarios, and the results are shown in FIGS. 4E & 4F. The 4-layer cascade device does not have higher peak heat flux or COP value compared to the unit cooling device, but it exhibits a four times larger $\Delta T_{device}$ up to 12 K. When operating at the same temperature span, the cascade device have higher heat flux and COP. $COP_{Carnot}$ indicates the COP of an ideal heat pump, and $COP/COP_{Carnot}$ measures the relative efficacy of a heat pump against the thermodynamic limit. FIG. 4F shows that the simulated $COP/COP_{Carnot}$ profile of the 4-layer cascade device. The maximum $COP/COP_{Carnot}$ value is 12% at $\Delta T_{device}=6$ K, under field intensity of 60 MV/m. In comparison, the unit device has a maximum $COP/COP_{Carnot}$ of only 3.8%. Table 1 compares the cascade device against competing state-of-the-art cooling technologies with compact size at the same temperature span. A remarkably high $COP/COP_{Carnot}$ of 44.2% may be projected for the cascade device upon further optimization.

Illustrative embodiments described herein show EC elements can be cascaded to amplify the device temperature lift and enhance the COP. In the cascade of even number of EC layers, adjacent EC elements move and function in antiphase to induce heat transfer in a cascade way to move heat against the temperature ingredient. The cascade EC heat pump effectively overcomes the shortcoming of limited adiabatic temperature lift of the EC material. Internal charge transfer cycle is implemented between each pair of the adjacent EC elements, recovering up to 70% of the input electric energy in each cycle. When operating at 60 MV/m (3000 V applied), the four-layer cascade device performs at the COP of 9.0 with active cooling power of 78.5 mW/cm² and temperature lift of 2.7 K. COP of 10.4 is obtained under zero temperature lift. The maximum temperature lift (no thermal load) is 8.7 K. Greater temperature span may be achievable by cascading more EC elements or raising the operating electric efield. Increasing the heat flux greater than 100 mW/cm² would entail improving the interfacial thermal conductivity, adopting EC elements with greater active thermal mass, operating the device under higher field intensities, or simply selecting EC material with more pronounced ECE.

4. Example Supplementary Data for the Examples 1-3 a. EC performance of P(VDF-TrFE-CFE) Material

Stainless steel wires were attached to the exposed CNT electrode region of EC polymer stack. The EC stack was connected to a high voltage power source (10/10B-HS, Trek Inc), and a voltage can be applied across the thickness dimension of the stack film. The imposed field intensity generates electrocaloric effect of the EC material, and was ramped up from 20 to 100 MV/m with a 10 MV/m interval. As is shown in FIG. 5A, active EC effect in response to square wave voltage signal was recorded as temperature change value with IR camera (9320P, ICI Infrared Cameras Inc). Rapid heating is observed upon voltage application, whereas instantaneous cooling accompanied voltage removal. Adiabatic temperature change of the EC polymer stack as a function of electric field is shown in FIG. 5B. Temperature change of 3.0 K at 60 MV/m and 4.9 K at 100 MV/m were achieved. Hysteresis test (displacement-electric field cycle shown in FIG. 5C) of the material is performed using a customized Sawyer-Tower circuit (Precision RT66B, Radiant Technologies Inc; 609E-6, Trek Inc).

b. Unit Device Structure and Fatigue Test

One end of the stack is fixed between the left spacer and the upper laminate sheet, and the other end between the right spacer and the bottom sheet. The soft and flexible nature of this as-prepared polymer stack makes it possible to be deformed with relatively weak forces, as long as the force surpasses the film bending stiffness. Electrostatic field was applied to rapidly transport the flexible EC polymer stack between the upper (heat source) and lower laminate (heat sink); electric field that drive the EC effect on the polymer stack was accurately correlated with the electrostatic actuation cycle. A slack is deliberately introduced into the mounted stack's S-shaped curvature, allowing the EC polymer stack film to conform to either upper or lower laminate surfaces during device operation, so that good thermal contact is attained for effective and active heat transfer from the heat source to the heat sink.

The device remained functional after 10-hrs consecutive operation under 50 MV/m EC field strength at 1.0 Hz, which translates to 36,000 cycles. Heat flux cycles were measured between every 1 or 2 hrs of non-stop operation. The standard deviation of heat flux values during each measurement was always smaller than 5%. The device showed fairly high robustness and fatigue-resistance in this test. The measured cooling heat flux after 10 hrs operation was slightly higher (by 7%) compared to its initial heat flux value.

c. Thermodynamics of Tandem Cooling Device

Thermodynamic refrigeration cycles of tandem cooling architecture predicts expanded device temperature span ($\Delta T_{device}$), and is represented by schematic illustration shown in FIG. 7. Brayton cycle, which contains two iso-field and two adiabatic processes, is experimentally practiced within the unit cooling device operation cycle (A→B→C→D). Maximum temperature span of an ideal unit cooling device is the absolute temperature change of a EC element upon application or removal of external electric field ($\Delta T_{ECE}$). Importantly, in a tandem junction structure, a single electrode laminate can serve simultaneously as a heat sink where heat is dumped to by one EC element, and as a heat source where heat is extracted from by a conjugated EC element. This unique feature (as indicated with horizontal green dashed line in FIG. 7) bridges isofield behaviors of two adjacent cycles, and enables relayed heat transfer via tandem from layer to layer, in a cascade style. Certain amount of heat can be picked-up from the heat source, and is pumped layer-by-layer towards the heat sink, with a uniform heat flux value throughout each temporally formed tandem structure. In this way, temperature change of individual unit cooling devices can be multiplied to build up higher $\Delta T_{device}$ (vertical green dashed line in FIG. 7). Ideally, in a device where heat loss can be neglected, $$\Delta T_{device} = n \Delta T_{ECE}$$

where n refers to the number of cooling units included in a tandem device.

d. Charge Transfer for Improved Device Efficiency

Active charge transfer between EC capacitors were practiced to recycle electrical energy, so that higher energy efficiency can be obtained. A charge transfer circuit is as shown in FIG. 8A. Consider a single charge transfer process, in which the capacitance of both EC capacitors is C, the inductance of inductor is L, series resistance in the circuit is R, voltage across the diode is $V_D$, and initial voltage across capacitor EC1 is $V_0$. Note that the diode is in forward bias mode, we can get the current and voltage differential equation through the loop as $$I = -C\frac{dV_{EC_1}}{dt} = C\frac{dV_{EC_2}}{dt} \tag{S1}$$

$$V_{EC1} - IR - V_D - V_{EC2} = L\frac{dI}{dt} \tag{S2}$$

Combining equation (1) and (2) we can get $$LC\frac{d^3 V_{EC_1}}{dt^2} + CR\frac{dV_{EC_2}}{dt} + V_{EC1} - V_{EC2} - V_D = 0 \tag{S3}$$

Consider the charge conservation i.e. the total charge on the two capacitors is constant, we have $$V_{EC1}C + V_{EC2}C = Q_0 = V_0 C \tag{S4}$$

Where $Q_0$ is the initial charge on capacitor EC1 and is equal to $V_0 C$. Put equation (4) into (3), we get the second order differential equation of this circuit with the single variable as $V_{EC1}$ $$LC\frac{d^3 V_{EC_2}}{dt^2} + CR\frac{dV_{EC_1}}{dt} + 2V_{EC1} - (V_D + V_0) = 0 \tag{S5}$$

Omitting the case of overdamped vibration, the actual solution of the above equation is $$V_{EC1}(t) = \frac{1}{2}(V_0 + V_D) + \frac{1}{2}(V_0 - V_D)\exp\left(-\frac{R}{2L} + 1\sqrt{8LC - C^2 R^2}\right)t \tag{S6}$$

$$V_{EC2}(t) = \frac{1}{2}(V_0 - V_D) - \frac{1}{2}(V_0 - V_D)\exp\left(-\frac{R}{2L} + 1\sqrt{8LC - C^2 R^2}\right)t \tag{S7}$$

Put in the actual values as $V_0$=3 kV, $V_D$=1 V, R=10Ω, L=220 µH, C=10 nF, we can verify that $8LC - C^2 R^2 > 0$, which indicate the system as underdamped. To visualize the solution of this equation, we conducted a simulation using COMSOL, and the result is shown in FIG. 8B. After the curve reaches its maximum (i.e., 340 µs, 2875 V), the voltage across capacitor EC2 will cease its vibration and saturate at the peak point. This is caused by the reverse saturation feature of the diode, and in reality the voltage will decay very slowly; assume leakage current is at ~µA, the voltage drop rate will be ~100 V/s.

In FIG. 8B, the solid blue curve corresponds to the case with diode, while the dashed red curve corresponds to that without diode. From the simulation result we can measure the decay time constant as 42.7 µs, which corresponds well with the theoretical calculation R/2L=227 µs. The simulated vibration cycle is ~6.6 µs, which is significantly smaller than the decay time constant. This guaranteed the high energy recovery efficiency since voltage waveform will reach its maximum and cease to decay far before the energy in the circuit is largely consumed. The simulated voltage recovery rate is 95.8%, which corresponds to an energy recovery efficiency of 91.7%.

FIG. 8C displays experimental voltage change on two coupled EC capacitors in a charge recovery circuit. The two EC capacitors go through antiphase charging/discharging cycles, which results in antiphase ECE shown in FIG. 2C. A 10 ms time interval was introduced between the charge transfer and fully charging steps. The charge transfer process is complete in less than 10 µs, which agrees with the simulated result of 6.6 µs. Experimental voltage recovery rate is 84%, indicating an energy regeneration rate of over 70%. Therefore, application of this approach effectively lower energy consumption of a tandem device by 70%.

e. Measurement and Calculation of Device Power Consumption

Voltage and current on a EC polymer stack is essential to determine electric power consumption of a EC device. Here, we adopt a voltage divider circuit (FIG. 9A) to simultaneously measure the applied voltage, as well as electric current during charging and discharging process of an EC unit device. An oscilloscope (PicoScope 2204A, Pico Technology) is used to record the voltage change across resistor R2 and R3. Voltage on the EC unit device, as well as charging/discharging current flow, can be conveniently calculated as:

$$I_{EC} = \frac{U3}{R3} \tag{S8}$$

$$U_{EC} = \frac{U2}{R2} \times (R1 + R2) - U3 \tag{S9}$$

here U2 and U3 stands for voltage data recorded on channel V2 and V3. $I_{EC}$ refers to the current of the device, and $U_{EC}$ is the voltage on the device.

FIG. 9B exhibits the voltage and current on a unit EC device; the device was operated under applied EC voltage of 3000 V, at 1.0 Hz frequency. Insignificant leakage can be found when comparing the charging and discharging currents of the device. The device electric energy consumption on ECE can be calculated as:

$$W_{EC} = \int_{t1}^{t2} U_{EC} \times I_{EC} dt \tag{S10}$$

where $W_{EC}$ is the electrical work done in one EC cycle to generate the EC adiabatic temperature change. The power consumption averaged over one cycle is 7.3 mW/cm² under an applied electric field of 60 MV/m at 1.0 Hz. Please note this value is largely dependent on EC material quality as well as material processing. A lower energy consumption value of 2 mW/cm² was achieved in our prior study, under similar test condition. A different batch of P(VDF-TrFE-CFE) (batch #064-004, Arkema Group, Piezotech) terpolymer was used in that study. This suggests room to further cut down device energy consumption and improve overall cooling efficiency, simply via selecting a more energy-efficient starting material.

With several unit EC devices running in synergy, a tandem cooling device intuitively consumes multiple times of electric energy. However, efficient energy recovery approach described in S5 was successfully adopted in the device, and this method has led to a cut down in energy consumption by ⅔.

Energy utilized to actuate the EC materials between the heat sink and heat source in a device also contribute to overall energy consumption, and should not be overlooked. In our electrostatic actuation method, an RC circuit (see FIG. 2A) was employed to achieve thorough discharging so that actuation can proceed swiftly. The charging and discharging current that flow through the resistor (1 MΩ) is too small to be experimentally measured, the energy consumed during electrostatic actuation in a single cycle is thus calculated as:

$$W_{actuation} = \frac{CU^3}{2}(1 - e^{-2t/RC}) \times 2n \tag{S11}$$

where $W_{actuation}$ is the total electric power consumed to maintain the shuttling of all EC polymer stacks between the hot and cold ends, C is the capacitance of the dielectric layer, U is the applied voltage to induce actuation, and n as number of EC elements in the tandem device. A total energy consumption is determined to be 0.15 mW/cm² for a 4-layer cascade device, operating under 16 MV/m electrostatic field intensity, at 1.0 Hz.

f. Performance of Cascade Device with Zero Temperature Span

FIG. 10 exhibits cooling performance of a 4-layer cascade device functioning under 60 MV/m field intensity, with device temperature span kept close to zero. A fin cooler is attached beneath the heat source, whereas an aluminum block as the heat sink (FIG. 10A). Thin layers of conductive paste were applied to ensure good thermal conductivity. Because the fin cooler and aluminum block quickly exchange heat with the ambient, temperature span between the heat source and the heat sink is minimized. Measured heat flux, as is shown in FIG. 10B increases as the device is operated under higher frequencies, it decreases as frequency greater than 1.0 Hz was applied. Peak heat flux measured under 1.0 Hz was 90.6 mW/cm², 15% greater than the peak heat flux (78.5 mW/cm²) achieved in FIG. 3, where a temperature span of 2.7 K was observed between the heat sink and the heat source. COP of the device decreases with increasing operation frequency; a COP of 10.4 was obtained at 1.0 Hz where device demonstrated the peak heat flux.

Measured stable heat flux under different frequencies (0.1, 0.5 and 1.5 Hz) were plotted against time and are shown as FIG. 10D-10F. Since the heat flux sensor records time-averaged heat flux data at 10 Hz, the calculated heat flux represents reliable cooling performance, even though the measured heat flux result does not reflect the exact heat flux change under relatively high frequency (FIG. 10F), compared to the well-defined figures achieved under lower frequencies (FIGS. 10D and 10E).

g. Simulation of the Cascade Cooling Device

A simple model is carried out to simulate the performance of unit and tandem EC devices. Heat transfer in an electrostatically driven EC device mainly involves heat conduction between EC film and laminate sheet, as well as heat dissipation to air.

Temperature of a heated or cooled object eventually settles at room temperature through passive heat transfer with air. Temperature profile of a cooling laminate object follows exponential decay, if interface thermal resistance with air dominates the heat transfer process:

$$\frac{T - T_0}{\Delta T} = \exp\left(-\frac{h}{\rho c l}\tau\right) \quad \text{(S12)}$$

where T is the temperature of the object at time $\tau$, $T_0$ is reservoir temperature, $\Delta T$ is the temperature difference between the object and reservoir at the onset of the cooling process, h is interface thermal conduction coefficient with the surrounding media, $\rho$, c and l refer to density, thermal capacity and thickness of the object, respectively.

FIG. 11A demonstrates exponential temperature decay profile of three EC films of different thickness (100, 25 and 8 μm). The three EC films were each triggered by electric field to have adiabatic temperature increase ~3 K at $\tau_0$, and were allowed to cool down in ambient condition. The experimental data were fitted with equation (S12) (see solid line in FIG. 11A) to determine interface thermal conduction coefficient h. h values obtained from the three curves are almost identical. Similar analysis were performed to determine thermal conduction coefficient between laminate sheet and air.

Heat conduction between two laminar objects across an interface is described by Fourier heat equation:

$$q = k\frac{\Delta T}{\Delta x} \quad \text{(S13)}$$

where q refers to heat flux from the hot to the cold surface, $\Delta T$ is the temperature difference between the two surfaces, and $\Delta x$ is the dimension of the interface. Heat conduction keeps on going until the two objects reach thermal equilibrium. Heat flux is dependent on the change in $\Delta T$.

Assuming no heat loss during heat conduction across the interface, and thermal conductivity inside the two objects are large compared to interface thermal conductivity (object always at equilibrium state), we have:

$$\delta Q = c_1 m_1 \delta T_1 = c_2 m_2 \delta T_2 \quad \text{(S14)}$$

$$\delta Q = q \delta t = k\frac{\Delta T - \delta T_1 - \delta T_3}{\Delta x}\delta t \quad \text{(S15)}$$

where $c_1 m_1$, $c_2 m_2$ refer to thermal capacitance of the two equally sized surfaces that are in thermal contact. By taking an infinitesimally small interval time $\delta t$, (S14) and (S15) are used to simulate momentary temperature change profile during heat transfer from a EC stack film to a laminate sheet within $\delta t$. FIG. 11B gives an example of heat transfer between EC film and laminate sheet. The two surfaces were coupled by electrostatic field of 20 MV/m, under initial thermal equilibrium condition. Upon removal of 55 MV/m electrocaloric field, the EC film abruptly cools down by 2.5 K; temperature of both EC film and the laminate sheet converge to thermal equilibrium upon heat transfer, in about 1 s. A fit parameter f to describe the combined influence of k and $\Delta x$ was determined via least squares method, this parameter decides the thermal conductance of the interface, and can be tuned by changing the Maxwell pressure induced by the electrostatic field. Interface thermal conductance parameters φ under a variety of electrostatic field intensities were mapped out.

Both heat loss to air and heat transfer between EC film and laminate sheet across an interface are taken into consideration in a simulation model to describe temperature profile of continuously operating EC devices. The model was utilized to describe performance of device we fabricated (FIG. 11C), and predict device capability of more complicated structures (FIG. 11D).

h. Performance Comparison with Competing Compact Cooling Technologies

TABLE 1

Performance comparison of compact thermoelectric and electrocaloric cooling devices

| Device | Temp. span (K) | COP | COP/COP$_{Carnot}$ | Ref |
|---|---|---|---|---|
| Thermoelectric | 5 | 4 | 6.9% | 1 |
| Thermoelectric | 6 | 3 | 6.2% | 2 |
|  | 3 | 4.5 | 4.6% |  |
| Thermoelectric† | 6 | 6.5 | 13.3% | † |
|  | 2.7 | 14.7 | 13.6% |  |
| Electrocaloric | 6 | 2.5 | 5.3% | 3 |
| Electrocaloric | 1.4 | 13 | 6.1% | 4 |
|  | 2.7 | — | — |  |
| Cascade Electrocaloric | 6 | 5.8 | 12.1% | This work* |
| Electrocaloric | 2.7 | 9.0 | 8.3% |  |
| Cascade Electrocaloric | 6 | 21.2 | 44.2% | Based on this work** |

†Commercial Peltier module, CP10-127-05 (Laird Thermal Systems)
*Cascade structure based on EC elements prepared from (#064-014, Arkema Group).
**Cascade structure based on EC elements prepared in Ma et al., Science 357(6356), 1130 (2017) (#064-004, Arkema Group).

Thermoelectric cooling under low temperature span (<10 K) and small cooling loads (<25 W) typically exhibits a COP of 4~5, and is nowadays the only commercial, energy-efficient cooling solution for small unit, portable applications. COP/COP$_{Carnot}$ value indicates how close a heat pump is to an ideal one, and is a better metric than COP when thermodynamic efficiency at different temperature spans. Several Peltier coolers recently developed as wearable device prototypes show COP values of 3~4 with $\Delta T$~6 K, giving rise to a COP/COP$_{Carnot}$ value of 6.2%.[1,2] In recent years, commercial Peltier unit† has been intensively studied, and has been optimized to approach its theoretical efficiency limit in such systems (COP=6.5 at 6K, data from Laird thermal systems). Our current experimental cascade EC heat pump, when operated at 60 MV/m field, has a maximum COP of 5.8 at $\Delta T$ of 6 K with COP/COP$_{Carnot}$ of 12.1%, which is 2 times as efficient as the lab-made wearable Peltier coolers at the same temperature span and is comparable to the commercial Peltier coolers which achieves COP of 6.5 at 6 K.

Under the same operating field of 60 MV/m, our cascade device experimentally exhibits a COP of 9.0 at $\Delta T$ of 2.7 K, with COP/COP$_{Carnot}$ of 8.3%, which is slightly lower than the COP/COP$_{Carnot}$ of 12.1% at $\Delta T$=6 K. The lab-made Peltier cooler[2] also exhibits a decrease of COP/COP$_{Carnot}$ from 6.2% at $\Delta T$=6 K to 4.6% at $\Delta T$=3 K. Commercial Peltier cooler can achieve a higher COP/COP$_{Carnot}$ of 13.6% $\Delta T$=2.7 K. However, it is important to note that this performance is obtained under optimized condition at the specific temperature lift (power condition was modified to make the $COP/COP_{Carnot}$ to peak at the specific $\Delta T$).

With further development, including the use of improved EC polymer and greater thermal mass, as well as engineering of the laminate layer with minimized thermal resistance, we anticipate that the efficiency of our cascade EC heat pump could be further increased by at least 3.65 times, and would be more than 3 times as efficient as the commercial Peltier unit in terms of $COP/COP_{Carnot}$ at $\Delta T$ of 6 K. Also note that the COP and $COP/COP_{Carnot}$ values shown in Table 1 were calculated device performance, and they should not be confused with material performance. The projected performance listed as the last entry in Table 1 is based on the "improved EC material" as reported in our previous work[4] and data for highly efficient EC materials discussed in a recent review[5].

i. Section 5 References

The following references are incorporated by reference herein
1. Kishore, R. A., Nozariasbmarz, A., Poudel, B., Sanghadasa, M. & Priya, S. Ultra-high performance wearable thermoelectric coolers with less materials. *Nat Commun* 10 (2019).
2. Hong, S., et al. Wearable thermoelectrics for personalized thermoregulation. *Sci Adv* 5 (2019).
3. Feng, D. D., Yao, S. C., Zhang, T. & Zhang, Q. M. Modeling of a Smart Heat Pump Made of Laminated Thermoelectric and Electrocaloric Materials. *J Electron Packaging* 138 (2016).
4. Ma, R. J., et al. Highly efficient electrocaloric cooling with electrostatic actuation. *Science* 357, 1130-1134 (2017).
5. Shi, J. Y., et al. Electrocaloric Cooling Materials and Devices for Zero-Global-Warming-Potential, High-Efficiency Refrigeration. *Joule* 3, 1200-1225 (2019).

5. Example Methods of Making the Devices of Sections 1-4 a. Preparation of Dispersed CNT Solution 8.0 mg of carbon nanotube (P3-SWCNT, Carbon Solution, Inc) was dispersed in a mixture solvent of 18 mL isopropanol (ACS plus, Fischer) and 2 mL deionized water. The mixture was subject to over 5 h of bath sonication (VWR B9500A-DTH). The solution was centrifuged (Centrifuge 5804, Eppendorf) at 8000 rpm for 15 min, and the supernatant was collected for flexible CNT electrode spray coating.

b. Preparation of Terpolymer Film

P(VDF-TrFE-CFE) (60/32/8 mol %) terpolymer (batch #064-014, Arkema Group, Piezotech) was purified through Soxhlet extraction before use. 1.0 g terpolymer was dissolved in 8.5 mL DMF (GR ACS, Millipore Sigma). The mixture was vigorously stirred under 65° C. overnight, to afford a clear solution. The solution was filtered through a hydrophilic PTFE filter with 0.2 μm pore size (Fisher Scientific), and sonicated for 15 min to degas. The terpolymer solution was casted onto a 10-10 $cm^2$ glass substrate, and dried under 55° C. overnight. The 50 μm thick terpolymer film was dried under 90° C. for another 30 min, to remove most of the DMF solvent. A predefined mask was placed on top of the terpolymer film, and CNT solution was spray coated onto the film to afford a CNT electrode with sheet resistance of 10 k$\Omega$/sq. Two of such films were peeled off the glass substrate, and attached one on top of the other using a rolling laminator (SircleLam 336-6R), with an overlapping region of 2×5 $cm^2$. A third CNT electrode was spray coated onto the bottom of the bilayer stack using the same mask. The resultant EC polymer stack (structure shown in FIG. 1B) was vacuum annealed at 120° C. overnight and rapidly quenched using dry ice.

c. Thermal Characterization

Temperature change on the terpolymer EC stack was determined with IR camera (9320P, Infrared Camera Inc). Heat flux sensor (HFS-4, OMEGA) was employed, and was calibrated by measuring Joule heating on a thin film resistor under different applied voltage. A thin as possible layer of high thermal conductivity paste (OMEGATHERM 201) was applied between device bottom surface and the fin cooler surface to facilitate heat conduction.

Device Embodiments

Devices according to embodiments described herein can be embodied in many ways, including but not limited to, the following (referring also to FIGS. 1-11).
1. A solid-state heat transporting cascade device (e.g., as illustrated in FIG. 1A), comprising:
  a first heat transfer laminate, comprising:
    a first dielectric substrate having a smooth surface;
    an (e.g., substrate) electrode forming a layer on the smooth surface;
    a second dielectric substrate formed on the other side of the electrode and having a smooth surface;
  a first flexible electrocaloric element, comprising:
    an electrocaloric material layer having a smooth surface;
    a flexible electrode layer forming a layer on the smooth surface of the electrocaloric material;
    a fixed portion attached a first portion of the first heat transfer laminate; and
    a movable portion that is movable with respect to the first heat transfer laminate; and
  a second flexible electrocaloric element, comprising:
    an electrocaloric material layer having a smooth surface;
    a flexible electrode layer forming a layer on the smooth surface of the electrocaloric material;
    a fixed portion attached to a second portion of the first heat transfer laminate; and
    a movable portion that is movable with respect to the first heat transfer laminate.
2. The cascade device of example 1, further comprising.
  a second heat transfer laminate, comprising:
    a dielectric substrate having a smooth surface;
    a substrate electrode forming a layer on the smooth surface;
    a second dielectric substrate formed on the other side of the substrate electrode and having a smooth surface; and
    wherein the second flexible electrocaloric element has a fixed portion attached to a portion of the second heat transfer laminate and a movable portion that is movable with respect to the second heat transfer laminate.
3. The cascade device of example 1, wherein the first and second flexible electrocaloric elements are controlled to form thermal contact with the opposite surfaces of the first heat transfer laminate so that various amounts of heat may be transported from the first flexible electrocaloric element to the second flexible electrocaloric element through the first heat transfer laminate.

3b. The cascade device of any of the examples 1-3, wherein the smooth surfaces are sufficiently smooth to achieve the thermal contact between the flexible electrocaloric elements and the heat transfer laminate.

4. The cascade device of any of examples 1 through 3, wherein each of the flexible electrocaloric elements comprises the electrocaloric material layer having an electrocaloric material that absorbs or releases the heat as a function of an electric field applied across the electrocaloric material.

5. The cascade device of example 4, further comprising an electrode on a flexible electrocaloric element, wherein the thermal contact of the flexible electrocaloric element with a heat transfer laminate is controlled by applying an electrostatic field between the electrode and the substrate electrode of the heat transfer laminate.

6. The cascade device of example 4, comprising a resistor connected in parallel with the flexible electrode of the first flexible electrocaloric element and the substrate electrode on the first heat transfer laminate.

7. The cascade device of example 4, further comprising a resistor connected in parallel with the flexible electrode of the second flexible electrocaloric element and the substrate electrode on the first heat transfer laminate.

8. The cascade device of any of example 6 and 7, wherein the resistors have a resistance value greater than $10000\Omega$ but less than $1000000000\Omega$.

9. The cascade device of example 4, wherein said dielectric layer of the heat transfer laminates is a polymer selected from the group comprising polyimide, polyurethane, polyacrylate, polyvinylidene fluoride, polyethylene terephthalate, polydimethylsiloxane, a combination (mixture or copolymer) thereof.

10. The cascade device of example 4, wherein said electrode comprises a conductive material selected from the group including carbon nanotube, silver nanowire, graphene, MXenes, metal shim, indium-tin oxide, aluminum, copper, and a combination thereof.

11. The cascade device of example 4, wherein said flexible electrode layer comprises a conductive material selected from the group including carbon nanotube, silver nanowire, graphene, MXenes, metal shim, indium-tin oxide, aluminum, copper, and a combination thereof.

12. The cascade device of example 4, wherein the first flexible electrocaloric element defines an air gap between its flexible electrode layer and the smooth substrate of the first heat transfer laminate.

13. The cascade device of example 4, wherein the second flexible electrocaloric element defines an air gap between its flexible electrode layer and the smooth substrate of the first heat transfer laminate.

14. The cascade device of example 4, wherein the first flexible electrocaloric element defines a contact first zone where an air gap decreases to zero at a location between the first flexible electrocaloric element and the first heat transfer laminate, when a voltage is applied between the flexible electrode layer of the first flexible electrocaloric element and the substrate electrode of the first heat transfer laminate.

15. The cascade device of example 14, wherein the first flexible electrocaloric element defines a second contact zone where an air gap decreases to zero at a location between the first flexible electrocaloric element and the second heat transfer laminate, when the voltage between the flexible electrode layer of the first electrocaloric element and the substrate electrode of the first heat transfer laminate is removed, and a voltage is applied between the flexible electrode layer of the first flexible electrocaloric element and the substrate electrode of the second heat transfer laminate.

16. A multilayer cascade device of example 1, comprising a number n of flexible electrocaloric elements and a number n−1 of heat transfer laminates alternatingly arranged.

17. The multilayer cascade device of example 16, wherein one of the heat transfer laminates forms thermal contact with its two neighboring flexible electrocaloric elements comprising an upper electrocaloric element and a lower electrocaloric element, when:
  a voltage is applied both between the flexible electrode layer of the upper electrocaloric element and the substrate electrode of the one of the heat transfer laminates and between the flexible electrode layer of the lower electrocaloric element and the substrate electrode of the one of the heat transfer laminates, and
  no voltage is applied between the flexible electrode layer of the upper electrocaloric element and the substrate electrode of the heat transfer laminate above the upper electrocaloric element and between the flexible electrode layer of the lower electrocaloric element and the substrate electrode of the heat transfer laminate below the lower electrocaloric element; and
  the heat transfer laminates adjacent to the one of the heat transfer laminates form an air gap with their respective adjacent flexible electrocaloric elements.

18. The multilayer cascade device of example 16, wherein every two adjacent flexible electrocaloric elements the move in opposite directions.

19. The multilayer cascade device of example 16, wherein a periodical electric field is applied on every other electrocaloric elements, and a complementary electric field is applied on the other electrocaloric elements.

20. The multilayer cascade device of example 19, wherein the two mutually complementary electric fields are induced by a charge recovery circuit that transfers charges between adjacent electrocaloric elements, i.e., between electrocaloric element 1 and 2, between electrocaloric element 3 and 4, and so on.

21. The multilayer cascade device of example 16, the movement and position of all involved flexible electrocaloric elements are controlled by a charge transfer circuit, so that:
  all the flexible electrocaloric elements oscillate between their respective first and second contact zones;
  each adjacent pair of adjacent flexible electrocaloric elements are operated in antiphase electrocaloric effect, i.e., when a flexible electrocaloric element is heated up, its two neighboring flexible electrocaloric elements are cooled down, and vice versa;
  charges are transferred between each adjacent pair of adjacent flexible electrocaloric elements;
  when the flexible electrocaloric element next to a heat sink is in thermal contact with the heat sink and is heated through the electrocaloric effect, every other flexible electrocaloric element is simultaneously heated through the electrocaloric effect, while all the remaining other flexible electrocaloric elements are cooled through the electrocaloric cooling effect, and the flexible electrocaloric element of these remaining other flexible electrocaloric elements next to a heat source is in thermal contact with the heat source.

22. The multilayer cascade device of example 16, wherein:
  each flexible electrocaloric element has a thickness in a range of 1-1000 micrometers, each flexible electrocaloric element has heat transfer area in a range of 5 to 50000 mm$^2$; and
the periodic electric field has a frequency in a range of 0.01 to 20 Hz and a magnitude less than 500 MV/m.

23. The heat transporting cascade device of example 1, wherein the flexible electrocaloric element comprises vinylidene fluoride-trifluoroethylene-chlorfluoroethylene terpolymer (P(VDF-TrFE-CFE)).

24. FIG. 1A illustrates an example of a device 100, comprising:
one or more heat transfer laminates 102 each comprising:
an electrode 104;
a first dielectric layer 106 on a first side 108 of the electrode; and
a second dielectric layer 110 on a second side 112 of the electrode;
a plurality of flexible electrocaloric elements 114, each of the flexible electrocaloric elements 114 comprising:
an electrocaloric material layer 116;
a flexible electrode layer 118 on the electrocaloric layer;
one or more fixed portions 120 each attached to one of heat transfer laminates; and
a movable portion 122 that is movable with respect to the one of the heat transfer laminates.

25. FIG. 1A further illustrates an example of the device of example 24, wherein:
the one or more heat transfer laminates comprise a first heat transfer laminate (b) and a second heat transfer laminate (c),
the flexible electrocaloric elements comprise a first flexible electrocaloric element (1) and a second flexible electrocaloric element (2),
the first flexible electrocaloric element (1) has one of the fixed portions attached to a first portion 124 of the first heat transfer laminate (b) and the movable portion that is movable with respect to the first heat transfer laminate (b); and
the second flexible electrocaloric element (2) has:
the one or more fixed portions comprising a first fixed portion 120 attached to
a second portion 126 of the first heat transfer laminate (b) and a second fixed portion 120 attached to the second heat transfer laminate (c), and
the movable portion that is movable with respect to the second heat transfer laminate (c).

26. FIG. 1A further illustrates an example of the device of examples 24 or 25, further comprising:
one or more components 128 each comprising:
one of the heat transfer laminates comprising a first heat transfer laminate (b) having opposite surfaces comprising a first surface 130 opposite a second surface 132; and
a pair of the flexible electrocaloric elements comprising a first flexible electrocaloric element (1) having one of the fixed portions attached to a first portion of the first heat transfer laminate (b) and a second flexible electrocaloric element (2) having one of the fixed portions attached to a second portion of the first heat transfer laminate (b); and wherein:
the first flexible electrocaloric element (1) is controlled to form thermal contact with the first surface 130 and the second flexible electrocaloric element (2) is controlled to form thermal contact with the second surface 132 so that various amounts of heat may be transported from the first flexible electrocaloric element (1) to the second flexible electrocaloric element (2) through the first heat transfer laminate (b).

27. FIG. 1A and FIG. 2B further illustrates an example of the device of any of examples 24-26, wherein the electrocaloric material layer 116 comprises an electrocaloric material that absorbs or releases the heat as a function of an electric field 204 (e.g., using power source 202 or voltage U1) applied across the electrocaloric material.

28. FIG. 1A further illustrates an example of the device of any of the examples 24-27, wherein a thermal contact of the flexible electrocaloric elements 114 with the one of the heat transfer laminates 102 is controlled by applying an electrostatic field 204 between the flexible electrode layer 118 and the electrode 104 of the one of the heat transfer laminates.

29. FIG. 2A and FIG. 9 illustrate an example of the device of any of the examples 24-28, comprising a resistor 200 connected in parallel with the flexible electrode layer 118 and the electrode 104 of the one of the heat transfer laminates 102.

30. The device of example 26, comprising a resistor 200 connected in parallel with the flexible electrode layer of the first flexible electrocaloric element and the electrode of the first heat transfer laminate.

31. The device of example 26 or 30, further comprising a resistor 200 connected in parallel with the flexible electrode layer of the second flexible electrocaloric element and the electrode on the first heat transfer laminate.

32. The device of any of examples 29-31 wherein the resistors 200 have a resistance value greater than 10,000Ω but less than 100,000,000Ω.

33. FIG. 1A further illustrates an example of the device of any of the examples 24-32, wherein the first dielectric layer 106 and the second dielectric layer 110 of the heat transfer laminates comprise at least one polymer selected from at least one of a polyimide, a polyurethane, a polyacrylate, a polyvinylidene fluoride, a polyethylene terephthalate, a polydimethylsiloxane, and/or a combination (mixture or copolymer) thereof.

34. The (e.g., cascade) device of any of the examples 24-33, wherein the electrode 104 comprises at least one conductive material selected from at least one of one or more carbon nanotubes, one or more silver nanowires, graphene, one or more MXenes, a metal shim, indium-tin oxide, aluminum, and/or copper.

35. The (e.g., cascade) device of any of the examples 24-34, wherein the flexible electrode layer 118 comprises at least one conductive material selected from at least one of one or more carbon nanotubes, one or more silver nanowires, graphene, one or more MXenes, a metal shim, indium-tin oxide, aluminum, and/or copper.

36. FIG. 1A further illustrates an example of the (e.g., cascade) device 100 of any of the examples 24-35, further comprising:
one or more components 128 each comprising:
one of the heat transfer laminates comprising a first heat transfer laminate (b) having opposite surfaces comprising a first surface 130 opposite a second surface 132; and
a pair of the flexible electrocaloric elements comprising a first flexible electrocaloric element (1) having the fixed portion 120 attached to a first portion 124 of the first heat transfer laminate (b) and a second flexible electrocaloric element (2) having the fixed portion 120 attached to a second portion 126 of the first heat transfer laminate; and wherein:

the first flexible electrocaloric element (1) defines a first air gap 134 between its flexible electrode layer 118 and the first surface 130 of the first heat transfer laminate (e.g., the first surface can be the first smooth surface of the first dielectric layer 106).

37. FIG. 1A further illustrates an example of the cascade device of example 36, wherein the second flexible electrocaloric element (2) defines a second air gap 136 between its flexible electrode layer 118 and the second surface 132 of the first heat transfer laminate (e.g., the second surface can be the second smooth surface of the second dielectric layer 110)

38. FIG. 1A further illustrates an example of The device of any of the examples 24-37, further comprising: one or more components 128 each comprising:
one of the heat transfer laminates 102 comprising a first heat transfer laminate (b) having opposite surfaces comprising a first surface 130 opposite a second surface 132; and
a pair of the flexible electrocaloric elements comprising a first flexible electrocaloric element (1) having the fixed portion 120 attached to a first portion 124 of the first heat transfer laminate (b) and a second flexible electrocaloric element (2) having the fixed portion 120 attached to a second portion 126 of the first heat transfer laminate (b); and wherein:
the first flexible electrocaloric element (b) defines a first contact zone where a first air gap 134 decreases to zero at a location between the first flexible electrocaloric element (1) and the first heat transfer laminate (b), when a voltage is applied between the flexible electrode layer 118 of the first flexible electrocaloric element (1) and the electrode 104 of the first heat transfer laminate (b).

39. FIG. 1A further illustrates an example of the device of example 38, wherein:
the heat transfer laminates comprise the first heat transfer laminate (1) and a second heat transfer laminate (2),
the second flexible electrocaloric element defines a second contact zone where a second air gap 136 decreases to zero at a location between the second flexible electrocaloric element (2) and the second heat transfer laminate (c), when:
the voltage between the flexible electrode layer 118 of the first electrocaloric element (b) and the electrode 104 of the first heat transfer laminate (b) is removed, and
a voltage is applied between the flexible electrode layer 118 of the second flexible electrocaloric element (2) and the electrode 104 of the second heat transfer laminate (c).

40. FIG. 1A further illustrates an example of the device of any of the examples 24-39, comprising a number n of the flexible electrocaloric elements 114 and a number m=n−1 of the heat transfer laminates 102.

41. FIG. 1A further illustrates an example of the device of example 40, wherein:
the heat transfer laminates comprise one or more groups of the heat transfer laminates 102, each of the groups comprising a first heat transfer laminate (c), a second heat transfer laminate (b), and a third heat transfer laminate (d),
the first heat transfer laminate (c) forms a thermal contact with two neighboring ones of the flexible electrocaloric elements (2,3) comprising an upper electrocaloric element (2) and a lower electrocaloric element (3), when:
a voltage is applied both:
between the flexible electrode layer 118 of the upper electrocaloric element (2) and the electrode 104 of the first heat transfer laminate (c), and
between the flexible electrode layer 118 of the lower electrocaloric element (3) and the electrode 104 of the first heat transfer laminate (c), and
no voltage is applied:
between the flexible electrode layer of the upper electrocaloric element (1) and the electrode 104 of the second heat transfer laminate (a) above the upper electrocaloric element (2), and
between the flexible electrode layer 118 of the lower electrocaloric element (3) and the electrode 104 of the third heat transfer laminate (d) below the lower electrocaloric element (3); and
the second heat transfer laminate (a) and the third heat transfer laminate (d) form an air gap 134 with their respective adjacent flexible electrocaloric elements 114.

42. FIG. 1A further illustrates an example of the device of examples 40 or 41, wherein:
the flexible electrocaloric elements 114 are disposed in a plurality of m pairs, each pair comprising a first flexible electrocaloric element (1) and a second flexible electrocaloric element (2) attached on opposite sides of the one of the heat transfer laminates (b); and
the first flexible electrocaloric element (1) and the second electrocaloric element (2) are biased to move in opposite directions.

43. FIG. 1A, FIG. 2A, FIG. 6, and FIG. 9 further illustrates an example of the device of any of the examples 40-42, wherein the flexible electrocaloric elements 114 are disposed in a plurality of m pairs, each pair comprising a first flexible electrocaloric element (1) and a second flexible electrocaloric element (2) attached on opposite sides 13, 132 of one of the heat transfer laminates 102, the device further comprising a source 202, 600, 900 applying a first electric field 204 to the first flexible electrocaloric element (1) in each of the pairs and a second electric field 204 to the second flexible electrode (2) in each of the pairs.

44. FIG. 8 illustrates an example of the device of example 43 further comprising a charge recovery circuit 800 applying the electric fields 204.

45. FIG. 8 and FIG. 1A illustrate an example of the device any of the examples 40-44, wherein a charge recovery circuit 800 that transfers charges between the first flexible electrocaloric element (1) and the second flexible electrocaloric element (2) in each pair of the flexible electrocaloric elements 114.

46 FIG. 10 illustrates an example of the (e.g., multilayer cascade) device 100 of any of the examples 40-45, wherein:
the flexible electrocaloric elements 114 are disposed in a plurality of m pairs, each pair comprising a first flexible electrocaloric element 1000 and a second flexible electrocaloric element 1002,
each of the heat transfer laminates 102 are attached to a different one of the m pairs, so that the $j^{th}$ heat transfer laminate 1004 is attached between the first flexible electrocaloric element 1000 and the second electrocaloric element 1002 in the $j^{th}$ pair, for $1 \leq j \leq m$,
movement and position of the flexible electrocaloric elements are controlled by a charge transfer circuit 800, so that:
the first electrocaloric element 1000 forms a first contact zone 1006 on the $j^{th}$ heat transfer laminate 1004 attached to the $j^{th}$ pair and a second contact zone 1008 with the j-1$^{th}$ heat transfer laminate 1010 attached to the j-1$^{th}$ pair, for 2<j≤m, the second electrocaloric element 1002 forms a third contact zone 1012 on the j$^{th}$ heat transfer laminate 1004 attached to the j$^{th}$ pair and a fourth contact zone 1014 on the j+1$^{th}$ heat transfer laminate 1016 attached to the j+1$^{th}$ pair, for 1≤j<m the first flexible electrocaloric elements 1000 oscillate between their respective first 1006 and second contact zones 1008 and the second flexible electrocaloric elements 1002 oscillate between their respective third 1012 and fourth contact zones 1014, the first flexible electrocaloric elements 1000 are operated using an antiphase electrocaloric effect so that when the first flexible electrocaloric elements 1000 are heated up, the second flexible electrocaloric elements 1002 are cooled down, and vice versa;

charges are transferred between the first flexible electrocaloric element 1000 and the second flexible electrocaloric element 1002 in each the m pairs of the flexible electrocaloric elements;

when the first flexible electrocaloric element 1000 next to a heat sink 1018 is in thermal contact with the heat sink and is heated through the electrocaloric effect, every other one of the first flexible electrocaloric elements 1000 are heated through the electrocaloric effect, while all the second flexible electrocaloric elements 1002 are cooled through the electrocaloric cooling effect and the second flexible electrocaloric element next to a heat source 1020 is in thermal contact with the heat source.

47. FIG. 1B illustrates an example of the multilayer cascade device of any of the examples 24-46, wherein:

each flexible electrocaloric element 114 has a thickness T in a range of 1-1000 micrometers (e.g., 1 micrometer≤T≤1000 micrometers), each flexible electrocaloric element 114 has heat transfer area A (170) in a range of 5 to 50000 mm$^2$ (e.g., 5 mm$^2$≤A≤50000 mm$^2$); and/or the electric field is periodic and has a frequency F in a range of 0.01 to 20 Hz (e.g., 0.01≤F≤20 Hz) and a magnitude less than 500 MV/m; and/or 48. The heat transporting cascade device of any of the examples 24-47, wherein the flexible electrocaloric elements 114 comprise vinylidene fluoride-trifluoroethylene-chlorfluoroethylene terpolymer (P(VDF-TrFE-CFE)).

49. The device of any of the examples 1-48, wherein the heat transfer laminate 102 comprises a steel sheet 104 with dielectric layers 106, 110 coated on both surfaces of the steel sheet, or wherein the electrode 104 comprises a steel sheet.

50. The device of any of the examples 1-49, wherein the heat transfer 102 laminate comprises a structure comprising dielectric layer/electrode layer/dielectric sheet/electrode layer/dielectric layer).

51. The device of any of the examples 1-50, wherein the heat transfer laminate comprises a sheet or support having a thickness for mechanical support (e.g., 10-50 micrometers thickness) and one or more layers on each side of the sheet or support, wherein the layers are thin, e.g., 100 nm and do not need to provide support.

52. The device of example 51, wherein the sheet or support comprises a metal (e.g., steel sheet) or dielectric sheet and the layers comprise dielectric layers and/or electrode layers.

53. The device of any of the examples 1-42, wherein the heat transfer laminate comprises one or more dielectric layers 114 coated on both sides of a support 104, wherein the support comprises a dielectric sheet or metal (e.g., steel) sheet, e.g., having a thickness 10 micrometers≤T≤50 micrometers and the dielectric layers 106, 110 or the electrode layer(s) on the sheet each have a thickness T2, e.g., 1 nm≤T2≤500 nm.

54. The device of any of the examples 1-53, wherein the support (e.g., mechanical support) mechanically supports the dielectric layers or the electrode comprises a layer on the support (e.g., mechanical support mechanically supporting the electrode layer and/or the dielectric layers).

55. The device of any of the examples 1-54, wherein:

the electrode comprises a support 104 or a substrate or the electrode comprises a layer on the support 104 or substrate, the support 104 or substrate comprises a metal sheet or a dielectric sheet, and the dielectric layers 114 are on opposite sides of the support 104 or the substrate.

56. The device of any of the examples 1-55, wherein the electric field controls an area of contact A between the flexible electrocaloric element and the heat transfer laminate so as to control an amount of the heat transferred.

Process Steps

FIG. 12 illustrates a method of making a device.

Block 1200 represents fabricating or obtaining one or more heat transfer laminates each comprising providing an electrode; depositing a first dielectric layer on a first side of the substrate electrode; and depositing a second dielectric layer on a second side of the substrate electrode.

Block 1202 represents fabricating or obtaining a plurality of flexible electrocaloric elements, wherein fabricating each of the flexible electrocaloric elements comprises obtaining an electrocaloric material layer; depositing a flexible electrode layer on the electrocaloric layer.

Block 1204 represents attaching one or more fixed portions of each of the flexible electrocaloric elements to one or more of the heat transfer laminates so that each of the flexible electrocaloric elements comprise a movable portion that is movable with respect to the one of the heat transfer laminates.

Block 1206 represents connecting circuitry comprising, e.g., at least one of a voltage source, charge recovery circuit, and/or other circuit component (e.g., resistor) to apply one or more electric fields to the device. The circuitry can include or be connected to computer 1300.

The method can be used and modified to fabricate the device of any of the examples 1-56. The method can further include attaching/thermally coupling the device to a heat sink and a heat source.

Processing Environment

FIG. 13 illustrates an exemplary system 1300 used to implement processing elements needed to control synchronization of the electric fields 204 applied to the device of FIG. 1A, for example.

The computer 1302 comprises a processor 1304 (general purpose processor 1306A and special purpose processor 1306B) and a memory 1306, such as random access memory (RAM). Generally, the computer 1302 operates under control of an operating system 1308 stored in the memory 1306, and interfaces with the user/other computers to accept inputs and commands (e.g., analog or digital signals from the crew or flight control system) and to present results through an input/output (I/O) module 1310. The computer program application 1312 accesses and manipulates data stored in the memory 1306 of the computer 1302. The operating system 1308 and the computer program 1312 are comprised of instructions which, when read and executed by the computer 1302, cause the computer 1302 to perform the operations and/or methods herein described. In one embodiment, instructions implementing the operating system 1308 and the computer program 1312 are tangibly embodied in the memory 1306, thereby making one or more computer program products or articles of manufacture capable of controlling the electric fields and device 100 as described herein. As such, the terms "article of manufacture," "program storage device" and "computer program product" as used herein are intended to encompass a computer program accessible from any computer readable device or media. Also shown is a source of power 1316 for the computer.

In one embodiment, computer 1300 comprises one or more field programmable gate arrays (FPGAs) or application specific integrated circuits (ASIC) or other circuit or integrated circuit or chip.

Those skilled in the art will recognize many modifications may be made to this configuration without departing from the scope of the present disclosure. For example, those skilled in the art will recognize that any combination of the above components, or any number of different components, peripherals, and other devices, may be used.

References

The following references are incorporated by reference herein

1. Jacobs, S., et al. The performance of a large-scale rotary magnetic refrigerator. International Journal of Refrigeration-Revue Internationale Du Froid 37, 84-91 (2014).
2. Lozano, J. A., et al. Performance analysis of a rotary active magnetic refrigerator. Applied Energy 111, 669-680 (2013).
3. Tura, A. & Rowe, A. Permanent magnet magnetic refrigerator design and experimental characterization. International Journal of Refrigeration-Revue Internationale Du Froid 34, 628-639 (2011).
4. Nair, B., et al. Large electrocaloric effects in oxide multilayer capacitors over a wide temperature range. Nature 575, 468-472 (2019).
5. Qian, J. F., et al. Interfacial Coupling Boosts Giant Electrocaloric Effects in Relaxor Polymer Nanocomposites: In Situ Characterization and Phase-Field Simulation. Advanced Materials 31, 1801949 (2019).
6. Zhang, G. Z., et al. Colossal Room-Temperature Electrocaloric Effect in Ferroelectric Polymer Nanocomposites Using Nanostructured Barium Strontium Titanates. Acs Nano 9, 7164-7174 (2015).
7. Neese, B., et al. Large electrocaloric effect in ferroelectric polymers near room temperature. Science 321, 821-823 (2008).
8. Mischenko, A. S., Zhang, Q., Scott, J. F., Whatmore, R. W. & Mathur, N. D. Giant electrocaloric effect in thin-film PbZr0.95Ti0.05O3. Science 311, 1270-1271 (2006).
9. Zhang, Q. M., Bharti, V. & Zhao, X. Giant electrostriction and relaxor ferroelectric behavior in electron-irradiated poly(vinylidene fluoride-trifluoroethylene) copolymer. Science 280, 2101-2104 (1998).
10. Kabirifar, P., et al. Elastocaloric Cooling: State-of-the-art and Future Challenges in Designing Regenerative Elastocaloric Devices. Strojniski Vestnik-Journal of Mechanical Engineering 65, 615-630 (2019).
11. Li, B., et al. Colossal barocaloric effects in plastic crystals. Nature 567, 506-510 (2019).
12. Lloveras, P., et al. Colossal barocaloric effects near room temperature in plastic crystals of neopentylglycol. Nature Communications 10, 1803 (2019).
13. Tusek, J., et al. A regenerative elastocaloric heat pump. Nature Energy 1, 16134 (2016).
14. Shi, J. Y., et al. Electrocaloric Cooling Materials and Devices for Zero-Global-Warming-Potential, High-Efficiency Refrigeration. Joule 3, 1200-1225 (2019).
15. Ozbolt, M., Kitanovski, A., Tusek, J. & Poredos, A. Electrocaloric refrigeration: Thermodynamics, state of the art and future perspectives. International Journal of Refrigeration-Revue Internationale Du Froid 40, 174-188 (2014).
16. Chen, X., et al. Towards electrocaloric heat pump-A relaxor ferroelectric polymer exhibiting large electrocaloric response at low electric field. Appl Phys Lett 113, 113902 (2018).
17. Li, X. Y., et al. Tunable temperature dependence of electrocaloric effect in ferroelectric relaxor poly(vinylidene fluoride-trifluoroethylene-chlorofluoroethylene terpolymer. Appl Phys Lett 99, 052907 (2011).
18. Zhang, X. & Zhao, L. D. Thermoelectric materials: Energy conversion between heat and electricity. Journal of Materiomics 1, 92-105 (2015).
19. Jia, Y. B. & Sungtaek, Y. A solid-state refrigerator based on the electrocaloric effect. Appl Phys Lett 100, 242901 (2012).
20. Gu, H. M., et al. A chip scale electrocaloric effect based cooling device. Appl Phys Lett 102, 122904 (2013).
21. Gu, H. M., Qian, X. S., Ye, H. J. & Zhang, Q. M. An electrocaloric refrigerator without external regenerator. Appl Phys Lett 105, 162905 (2014).
22. Sinyavsky, Y. V. & Brodyansky, V. M. Experimental Testing of Electrocaloric Cooling with Transparent Ferroelectric Ceramic as a Working Body. Ferroelectrics 131, 321-325 (1992).
23. Plaznik, U., et al. Bulk relaxor ferroelectric ceramics as a working body for an electrocaloric cooling device. Appl Phys Lett 106, 043903 (2015).
24. Ma, R. J., et al. Highly efficient electrocaloric cooling with electrostatic actuation. Science 357, 1130-1134 (2017).
25. Kitanovski, A. Energy Applications of Magnetocaloric Materials. Advanced Energy Materials 10 (2020).
26. Snodgrass, R. & Erickson, D. A multistage elastocaloric refrigerator and heat pump with 28 K temperature span. Scientific Reports 9 (2019).
27. Gu, H. M., et al. Simulation of chip-size electrocaloric refrigerator with high cooling-power density. Appl Phys Lett 102 (2013).
28. Zhang, T., Qian, X. S., Gu, H. M., Hou, Y. & Zhang, Q. M. An electrocaloric refrigerator with direct solid to solid regeneration. Appl Phys Lett 110, 243503 (2017).
29. Basiulis, A. & Berry, R. L. Solid-state electrocaloric cooling system and method. U.S. Pat. No. 4,757,688 (1988).
30. Mathur, N. & Mishchenko, A. Solid state electrocaloric cooling devices and methods. GB patent PCT/GB2005/050207. (2005).
31. Bradesko, A., et al. Coupling of the electrocaloric and electromechanical effects for solid-state refrigeration. Appl Phys Lett 109, 143508 (2016).
32. Pelrine, R., Kornbluh, R., Pei, Q. B. & Joseph, J. High-speed electrically actuated elastomers with strain greater than 100%. Science 287, 836-839 (2000).
33. Defay, E., et al. Enhanced electrocaloric efficiency via energy recovery. Nature Communications 9, 1827 (2018).
34. Campolo, D., Sitti, M. & Fearing, R. S. Efficient charge recovery method for driving piezoelectric actuators with quasi-square waves. Ieee Transactions on Ultrasonics Ferroelectrics and Frequency Control 50, 237-244 (2003).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
   one or more heat transfer laminates each comprising:
   an electrode;
   a first dielectric layer on a first side of the electrode; and
   a second dielectric layer on a second side of the electrode;
   a plurality of flexible electrocaloric elements, each of the flexible electrocaloric elements comprising:
   an electrocaloric material layer;
   a flexible electrode layer on the electrocaloric material layer;
   one or more fixed portions each attached to one of the heat transfer laminates; and
   a movable portion that is movable with respect to the one of the heat transfer laminates, and wherein:
   the flexible electrocaloric elements are disposed in a plurality of m pairs, each pair comprising a first flexible electrocaloric element and a second flexible electrocaloric element attached on opposite sides of the one of the heat transfer laminates; and
   the first flexible electrocaloric element and the second electrocaloric element are biased to move in opposite directions.

2. The device of claim 1, wherein:
   the one or more heat transfer laminates comprise a first heat transfer laminate and a second heat transfer laminate,
   the first flexible electrocaloric element has one of the fixed portions attached to a first portion of the first heat transfer laminate and the movable portion that is movable with respect to the first heat transfer laminate; and
   the second flexible electrocaloric element has:
   the one or more fixed portions comprising a first fixed portion attached to a second portion of the first heat transfer laminate and a second fixed portion attached to the second heat transfer laminate, and
   the movable portion that is movable with respect to the second heat transfer laminate.

3. The device of claim 1, further comprising:
   one or more components each comprising:
   the one of the heat transfer laminates comprising a first heat transfer laminate having opposite surfaces comprising a first surface opposite a second surface; and
   the first flexible electrocaloric element having one of the fixed portions attached to a first portion of the first heat transfer laminate and the second flexible electrocaloric element having one of the fixed portions attached to a second portion of the first heat transfer laminate; and
   wherein:
   the first flexible electrocaloric element is controlled to form thermal contact with the first surface and the second flexible electrocaloric element is controlled to form thermal contact with the second surface so that various amounts of heat may be transported from the first flexible electrocaloric element to the second flexible electrocaloric element through the first heat transfer laminate.

4. The device of claim 3, wherein the electrocaloric material layer comprises an electrocaloric material that absorbs or releases the heat as a function of an electric field applied across the electrocaloric material.

5. The device of claim 1, wherein a thermal contact of the flexible electrocaloric elements with the one of the heat transfer laminates is controlled by applying an electrostatic field between the flexible electrode layer and the electrode of the one of the heat transfer laminates.

6. The device of claim 1, comprising a resistor connected in parallel with the flexible electrode layer and the electrode of the one of the heat transfer laminates.

7. The device of claim 6 wherein the resistor has a resistance value greater than 10,000Ω but less than 100,000,000Ω.

8. The device of claim 1, wherein the first dielectric layer and the second dielectric layer of the heat transfer laminates comprise at least one polymer selected from at least one of a polyimide, a polyurethane, a polyacrylate, a polyvinylidene fluoride, a polyethylene terephthalate, a polydimethylsiloxane, or a combination (mixture or copolymer) thereof.

9. The device of claim 1, wherein the electrode comprises at least one conductive material selected from at least one of one or more carbon nanotubes, one or more silver nanowires, graphene, one or more MXenes, a metal shim, indium-tin oxide, aluminum, or copper.

10. The device of claim 1, wherein the flexible electrode layer comprises at least one conductive material selected from at least one of one or more carbon nanotubes, one or more silver nanowires, graphene, one or more MXenes, a metal shim, indium-tin oxide, aluminum, or copper.

11. The device of claim 1, further comprising:
    one or more components each comprising:
    the one or more heat transfer laminates comprising a first heat transfer laminate having opposite surfaces comprising a first surface opposite a second surface; and
    the first flexible electrocaloric element having the fixed portion attached to a first portion of the first heat transfer laminate and the second flexible electrocaloric element having the fixed portion attached to a second portion of the first heat transfer laminate; and wherein:
    the first flexible electrocaloric element defines a first air gap between its flexible electrode layer and the first surface of the first heat transfer laminate.

12. The device of claim 11, wherein the second flexible electrocaloric element defines a second air gap between its flexible electrode layer and the second surface of the first heat transfer laminate.

13. The device of claim 1, further comprising:
    one or more components each comprising:
    the one of the heat transfer laminates comprising a first heat transfer laminate having opposite surfaces comprising a first surface opposite a second surface; and
    the first flexible electrocaloric element having the fixed portion attached to a first portion of the first heat transfer laminate and the second flexible electrocaloric element having the fixed portion attached to a second portion of the first heat transfer laminate; and wherein:

the first flexible electrocaloric element defines a first contact zone where a first air gap decreases to zero at a location between the first flexible electrocaloric element and the first heat transfer laminate, when a voltage is applied between the flexible electrode layer of the first flexible electrocaloric element and the electrode of the first heat transfer laminate.

14. The device of claim 1, wherein:
the one or more heat transfer laminates comprise a first heat transfer laminate and a second heat transfer laminate,
the second flexible electrocaloric element defines a second contact zone where a second air gap decreases to zero at a location between the second flexible electrocaloric element and the second heat transfer laminate, when:
the voltage between the flexible electrode layer of the first electrocaloric element and the electrode of the first heat transfer laminate is removed, and
a second voltage is applied between the flexible electrode layer of the second flexible electrocaloric element and the electrode of the second heat transfer laminate.

15. The device of claim 1, comprising a number n of the flexible electrocaloric elements and a number m=n−1 of the heat transfer laminates.

16. The device of claim 15, wherein:
the heat transfer laminates comprise one or more groups of the heat transfer laminates, each of the groups comprising a first heat transfer laminate, a second heat transfer laminate, and a third heat transfer laminate,
the first heat transfer laminate forms a thermal contact with two neighboring ones of the flexible electrocaloric elements comprising an upper electrocaloric element and a lower electrocaloric element, when:
a voltage is applied both:
between the flexible electrode layer of the upper electrocaloric element and the electrode of the first heat transfer laminate, and
between the flexible electrode layer of the lower electrocaloric element and the electrode of the first heat transfer laminate, and
no voltage is applied:
between the flexible electrode layer of the upper electrocaloric element and the electrode of the second heat transfer laminate above the upper electrocaloric element, and
between the flexible electrode layer of the lower electrocaloric element and the electrode of the third heat transfer laminate below the lower electrocaloric element; and
the second heat transfer laminate and the third heat transfer laminate form an air gap with their respective adjacent flexible electrocaloric elements.

17. The device of claim 1, wherein:
the electrode comprises a support or the electrode comprises a layer on the support,
the support comprises a metal sheet or a dielectric sheet, and
the dielectric layers are on opposite sides of the support.

18. The device of claim 1, further comprising a charge recovery circuit that transfers charges between the first flexible electrocaloric element and the second flexible electrocaloric element in each pair of the flexible electrocaloric elements.

19. A device, comprising:
one or more heat transfer laminates each comprising:
an electrode;
a first dielectric layer on a first side of the electrode; and
a second dielectric layer on a second side of the electrode;
a plurality of flexible electrocaloric elements, each of the flexible electrocaloric elements comprising:
an electrocaloric material layer;
a flexible electrode layer on the electrocaloric material layer;
one or more fixed portions each attached to one of heat transfer laminates; and
a movable portion that is movable with respect to the one of the heat transfer laminates, wherein the flexible electrocaloric elements are disposed in a plurality of m pairs, each pair comprising a first flexible electrocaloric element and a second flexible electrocaloric element attached on opposite sides of the one of the heat transfer laminates, the device further comprising a source applying a first electric field to the first flexible electrocaloric element in each of the pairs and a second electric field to the second flexible electrode in each of the pairs.

20. The device of claim 19, further comprising a charge recovery circuit applying the electric fields, wherein:
the charge recovery circuit transfers charges between the first flexible electrocaloric element and the second flexible electrocaloric element in each pair of the flexible electrocaloric elements,
each of the heat transfer laminates are attached to a different one of the m pairs, so that the $j^{th}$ heat transfer laminate is attached between the first flexible electrocaloric element and the second electrocaloric element in the $j^{th}$ pair, for $1 \leq j \leq m$,
movement and position of the flexible electrocaloric elements are controlled by the charge transfer circuit, so that:
the first electrocaloric element forms a first contact zone on the $j^{th}$ heat transfer laminate attached to the $j^{th}$ pair and a second contact zone with the $j-1^{th}$ heat transfer laminate attached to the $j-1^{th}$ pair, for $2 \leq j \leq m$,
the second electrocaloric element forms a third contact zone on the $j^{th}$ heat transfer laminate attached to the $j^{th}$ pair and a fourth contact zone on the $j+1^{th}$ heat transfer laminate attached to the $j+1^{th}$ pair, for $1 \leq j \leq m$
the first flexible electrocaloric elements oscillate between their respective first and second contact zones and the second flexible electrocaloric elements oscillate between their respective third and fourth contact zones,
the first flexible electrocaloric elements are operated using an antiphase electrocaloric effect so that when the first flexible electrocaloric elements are heated up, the second flexible electrocaloric elements are cooled down, and vice versa;
charges are transferred between the first flexible electrocaloric element and the second flexible electrocaloric element in each the m pairs of the flexible electrocaloric elements;
when the first flexible electrocaloric element next to a heat sink is in thermal contact with the heat sink and is heated through the electrocaloric effect, every other one of the first flexible electrocaloric elements are heated through the electrocaloric effect, while all the second flexible electrocaloric elements are cooled through the electrocaloric cooling effect and the second flexible electrocaloric element next to a heat source is in thermal contact with the heat source.

21. The device of claim 19, further comprising a charge recovery circuit applying the electric fields.

* * * * *